US012328682B2

(12) United States Patent
Liu et al.

(10) Patent No.: US 12,328,682 B2
(45) Date of Patent: Jun. 10, 2025

(54) TECHNIQUES FOR PER COMMUNICATION LINK ENERGY RESERVATION

(71) Applicant: QUALCOMM Incorporated, San Diego, CA (US)

(72) Inventors: Tienyow Liu, Santa Clara, CA (US); Michel Chauvin, San Diego, CA (US); Farhad Meshkati, San Diego, CA (US); Raghu Narayan Challa, San Diego, CA (US); Reza Shahidi, La Jolla, CA (US); Arnaud Meylan, San Diego, CA (US); Yahia Ramadan, San Jose, CA (US); Jing Lin, Milpitas, CA (US); Tianpei Chen, San Diego, CA (US); Jagadish Nadakuduti, Bermuda Dunes, CA (US); Lin Lu, San Diego, CA (US); Paul Guckian, La Jolla, CA (US); Huang Lou, Santee, CA (US)

(73) Assignee: QUALCOMM Incorporated, San Diego, CA (US)

(*) Notice: Subject to any disclaimer, the term of this patent is extended or adjusted under 35 U.S.C. 154(b) by 364 days.

(21) Appl. No.: 17/934,284

(22) Filed: Sep. 22, 2022

(65) Prior Publication Data
US 2023/0156625 A1 May 18, 2023

Related U.S. Application Data

(60) Provisional application No. 63/269,399, filed on Mar. 15, 2022, provisional application No. 63/264,025, (Continued)

(51) Int. Cl.
*H04W 52/20* (2009.01)
*H04W 52/34* (2009.01)
*H04W 72/044* (2023.01)

(52) U.S. Cl.
CPC ..... *H04W 52/346* (2013.01); *H04W 72/0473* (2013.01)

(58) Field of Classification Search
CPC ... H04W 52/34; H04W 52/346; H04W 72/04; H04W 72/0473; H04L 1/0026
See application file for complete search history.

(56) References Cited

U.S. PATENT DOCUMENTS 11,917,461 B2 * 2/2024 Santhanam ..... H04W 36/00692
2019/0110223 A1 * 4/2019 Nekoui ................. H04W 28/18

FOREIGN PATENT DOCUMENTS

EP 2814292 A1 12/2014
WO WO-2020010232 A1 * 1/2020 ........... H04B 1/3838
(Continued)

OTHER PUBLICATIONS

International Search Report and Written Opinion—PCT/US2022/076918—ISA/EPO—Dec. 19, 2022.

*Primary Examiner* — Hai V Nguyen
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify an available energy for uplink transmission of a plurality of communication links of the UE. The UE may configure, from the available energy, a first set of energy allocations for the plurality of communication links. The UE may configure a second set of energy allocations for one or more communication links of the plurality of communication links, wherein the second set of energy allocations are allocated from a remainder of the available energy after the first set of energy allocations are allocated. The UE may transmit based at least in part on at least one of the first (Continued)

set of energy allocations or the second set of energy allocations. Numerous other aspects are described.

30 Claims, 13 Drawing Sheets

Related U.S. Application Data filed on Nov. 12, 2021, provisional application No. 63/264,023, filed on Nov. 12, 2021.

(56) References Cited

FOREIGN PATENT DOCUMENTS

| WO | WO-2022126060 A1 * | 6/2022 | ........... H04L 5/0023 |
| WO | WO-2023086701 A1 * | 5/2023 | .......... H04W 52/146 |

* cited by examiner

TECHNIQUES FOR PER COMMUNICATION LINK ENERGY RESERVATION

CROSS-REFERENCE TO RELATED APPLICATIONS

This patent application claims priority to U.S. Provisional Patent Application No. 63/264,025, filed on Nov. 12, 2021, entitled "TECHNIQUES FOR PER COMMUNICATION LINK ENERGY RESERVATION," U.S. Provisional Patent Application No. 63/269,399, filed on Mar. 15, 2022, entitled "TECHNIQUES FOR PER COMMUNICATION LINK ENERGY RESERVATION," and U.S. Provisional Patent Application No. 63/264,023, filed on Nov. 12, 2021, entitled "TECHNIQUES FOR DYNAMIC ENERGY ALLOCATION ACROSS MULTIPLE RADIOS," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for per communication link energy reservation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying an available energy for uplink transmission of a plurality of communication links of the UE. The method may include configuring, from the available energy, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The method may include configuring a second set of energy allocations for one or more communication links of the plurality of communication links, wherein the second set of energy allocations are allocated from a remainder of the available energy after the first set of energy allocations are allocated. The method may include transmitting based at least in part on at least one of the first set of energy allocations or the second set of energy allocations.

Some aspects described herein relate to a UE for wireless communication. The user equipment may include a memory and one or more processors coupled to the memory. The one or more processors may be configured to identify an available energy for uplink transmission of a plurality of communication links of the UE. The one or more processors may be configured to configure, from the available energy, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The one or more processors may be configured to configure a second set of energy allocations for one or more communication links of the plurality of communication links, wherein the second set of energy allocations are allocated from a remainder of the available energy after the first set of energy allocations are allocated. The one or more processors may be configured to transmit based at least in part on at least one of the first set of energy allocations or the second set of energy allocations.

Some aspects described herein relate to a non-transitory computer-readable medium that stores a set of instructions for wireless communication by a UE. The set of instructions, when executed by one or more processors of the UE, may cause the UE to identify an available energy for uplink transmission of a plurality of communication links of the UE. The set of instructions, when executed by one or more processors of the UE, may cause the UE to configure, from the available energy, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The set of instructions, when executed by one or more processors of the UE, may cause the UE to configure a second set of energy allocations for one or more communication links of the plurality of communication links, wherein the second set of energy allocations are allocated from a remainder of the available energy after the first set of energy allocations are allocated. The set of instructions, when executed by one or more processors of the UE, may cause the UE to transmit based at least in part on at least one of the first set of energy allocations or the second set of energy allocations.

Some aspects described herein relate to an apparatus for wireless communication. The apparatus may include means for identifying an available energy for uplink transmission of a plurality of communication links of the apparatus. The apparatus may include means for configuring, from the available energy, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The apparatus may include means for configuring a second set of energy allocations for one or more communication links of the plurality of communication links, wherein the second set of energy allocations are allocated from a remainder of the available energy after the first set of energy allocations are allocated. The apparatus may include means for transmitting based at least in part on at least one of the first set of energy allocations or the second set of energy allocations.

Some aspects described herein relate to a method of wireless communication performed by a UE. The method may include identifying an available energy for uplink transmission of a plurality of communication links of the UE. The method may include allocating a total minimum reserve among the plurality of communication links. The method may include configuring, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The method may include configuring a second set of energy allocations for one or more communication links of the plurality of communication links, wherein the second set of energy allocations are allocated from a remainder of the available energy after the first set of energy allocations are allocated. The method may include transmitting based at least in part on at least one of the first set of energy allocations or the second set of energy allocations.

Some aspects described herein relate to an apparatus of a UE for wireless communication. The apparatus may include a memory and one or more processors coupled to the memory. The one or more processors may be configured to identify an available energy for uplink transmission of a plurality of communication links of the UE. The one or more processors may be configured to allocate a total minimum reserve among the plurality of communication links. The one or more processors may be configured to configure, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The one or more processors may be configured to configure a second set of energy allocations for one or more communication links of the plurality of communication links, wherein the second set of energy allocations are allocated from a remainder of the available energy after the first set of energy allocations are allocated. The one or more processors may be configured to transmit based at least in part on at least one of the first set of energy allocations or the second set of energy allocations.

Some aspects described herein relate to a non-transitory computer-readable medium that stores a set of instructions for wireless communication by a UE. The set of instructions, when executed by one or more processors of the UE, may cause the UE to identify an available energy for uplink transmission of a plurality of communication links of the UE. The set of instructions, when executed by one or more processors of the UE, may cause the UE to allocate a total minimum reserve among the plurality of communication links. The set of instructions, when executed by one or more processors of the UE, may cause the UE to configure, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The set of instructions, when executed by one or more processors of the UE, may cause the UE to configure a second set of energy allocations for one or more communication links of the plurality of communication links, wherein the second set of energy allocations are allocated from a remainder of the available energy after the first set of energy allocations are allocated. The set of instructions, when executed by one or more processors of the UE, may cause the UE to transmit based at least in part on at least one of the first set of energy allocations or the second set of energy allocations.

Some aspects described herein relate to an apparatus for wireless communication. The apparatus may include means for identifying an available energy for uplink transmission of a plurality of communication links of the apparatus. The apparatus may include means for allocating a total minimum reserve among the plurality of communication links. The apparatus may include means for configuring, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission. The apparatus may include means for configuring a second set of energy allocations for one or more communication links of the plurality of communication links, wherein the second set of energy allocations are allocated from a remainder of the available energy after the first set of energy allocations are allocated. The apparatus may include means for transmitting based at least in part on at least one of the first set of energy allocations or the second set of energy allocations.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
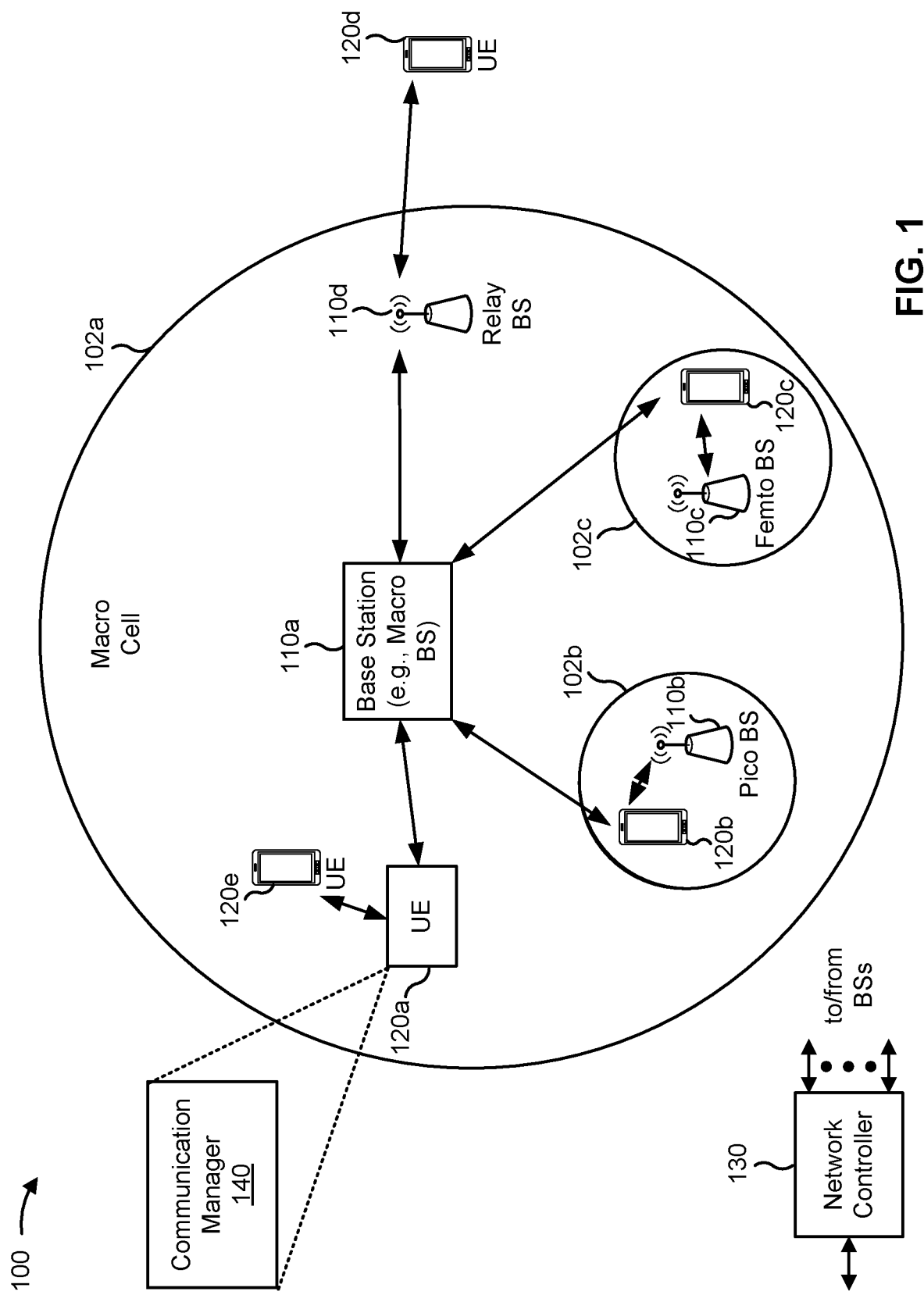
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., LTE) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify an available energy for uplink transmission of a plurality of communication links of the UE; configure, from the available energy, a first set of energy allocations for the plurality of communication links, wherein the first set of energy allocations are based at least in part on at least one of a corresponding control traffic parameter or a corresponding requested amount of energy for each communication link of the plurality of communication links, wherein the corresponding requested amount of energy is based at least in part on a priority of a transmission; configure a second set of energy allocations for one or more communication links of the plurality of communication links, wherein the second set of energy allocations are allocated from a remainder of the available energy after the first set of energy allocations are allocated; and transmit based at least in part on at least one of the first set of energy allocations or the second set of energy allocations. Additionally, or alternatively, the communication manager 140 may perform one or more other operations described herein.

As indicated above, FIG. 1 is provided as an example. Other examples may differ from what is described with regard to FIG. 1.

Figure 2:
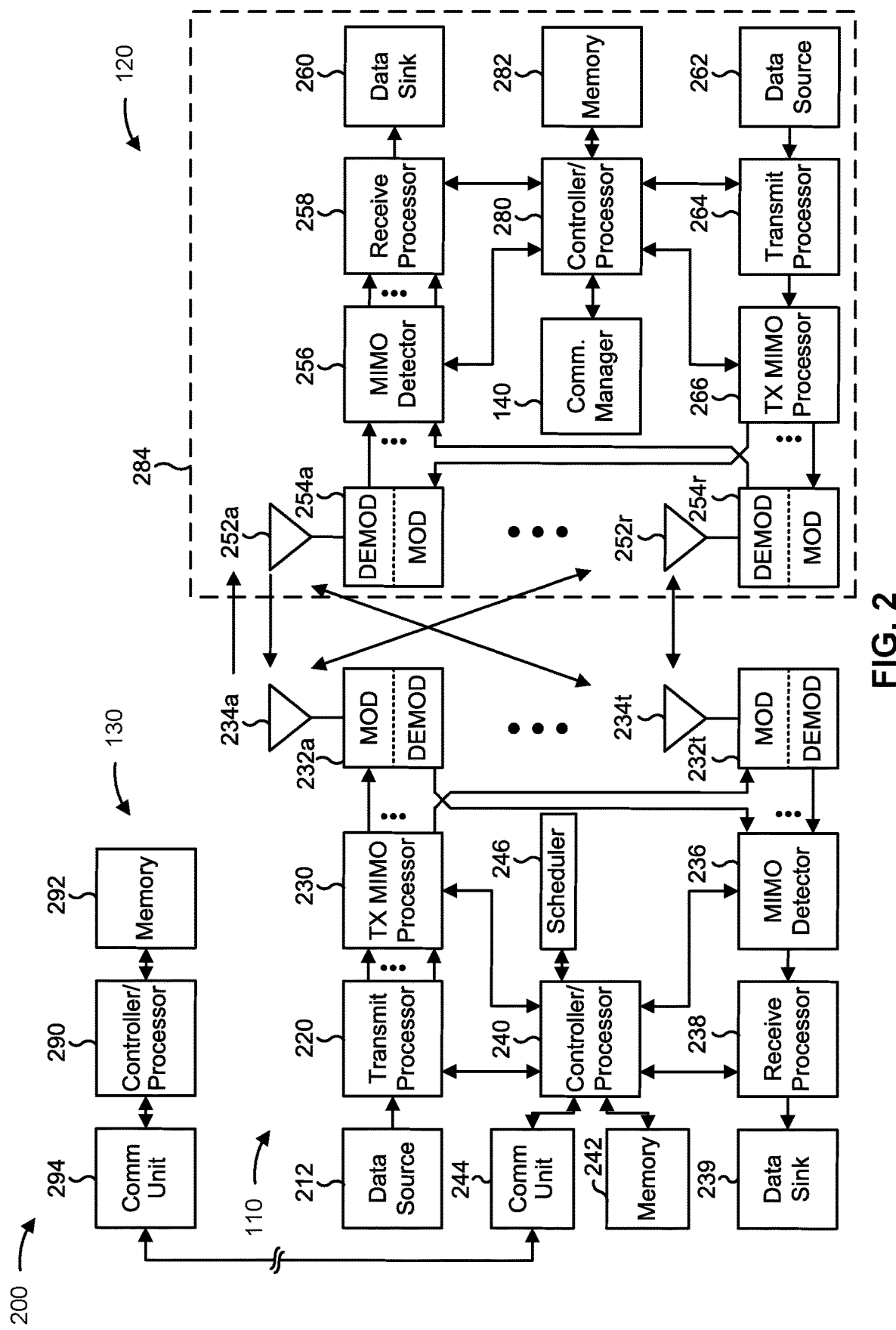
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-13).

The controller/processor 240 of the base station 110, the controller/processor 280 of the UE 120, and/or any other component(s) of FIG. 2 may perform one or more techniques associated with per communication link energy reservation, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 1200 of FIG. 12, and/or other processes as described herein. In some examples, executing instructions may include running the instructions, converting the instructions, compiling the instructions, and/or interpreting the instructions, among other examples.

In some aspects, the UE includes means for identifying an available energy for uplink transmission of a plurality of communication links of the UE; means for configuring, from the available energy, a first set of energy allocations for the plurality of communication links, wherein the first set of energy allocations are based at least in part on at least one of a corresponding control traffic parameter or a corresponding requested amount of energy for each communication link of the plurality of communication links, wherein the corresponding requested amount of energy is based at least in part on a priority of a transmission; means for configuring a second set of energy allocations for one or more communication links of the plurality of communication links, wherein the second set of energy allocations are allocated from a remainder of the available energy after the first set of energy allocations are allocated; and/or means for transmitting based at least in part on at least one of the first set of energy allocations or the second set of energy allocations. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
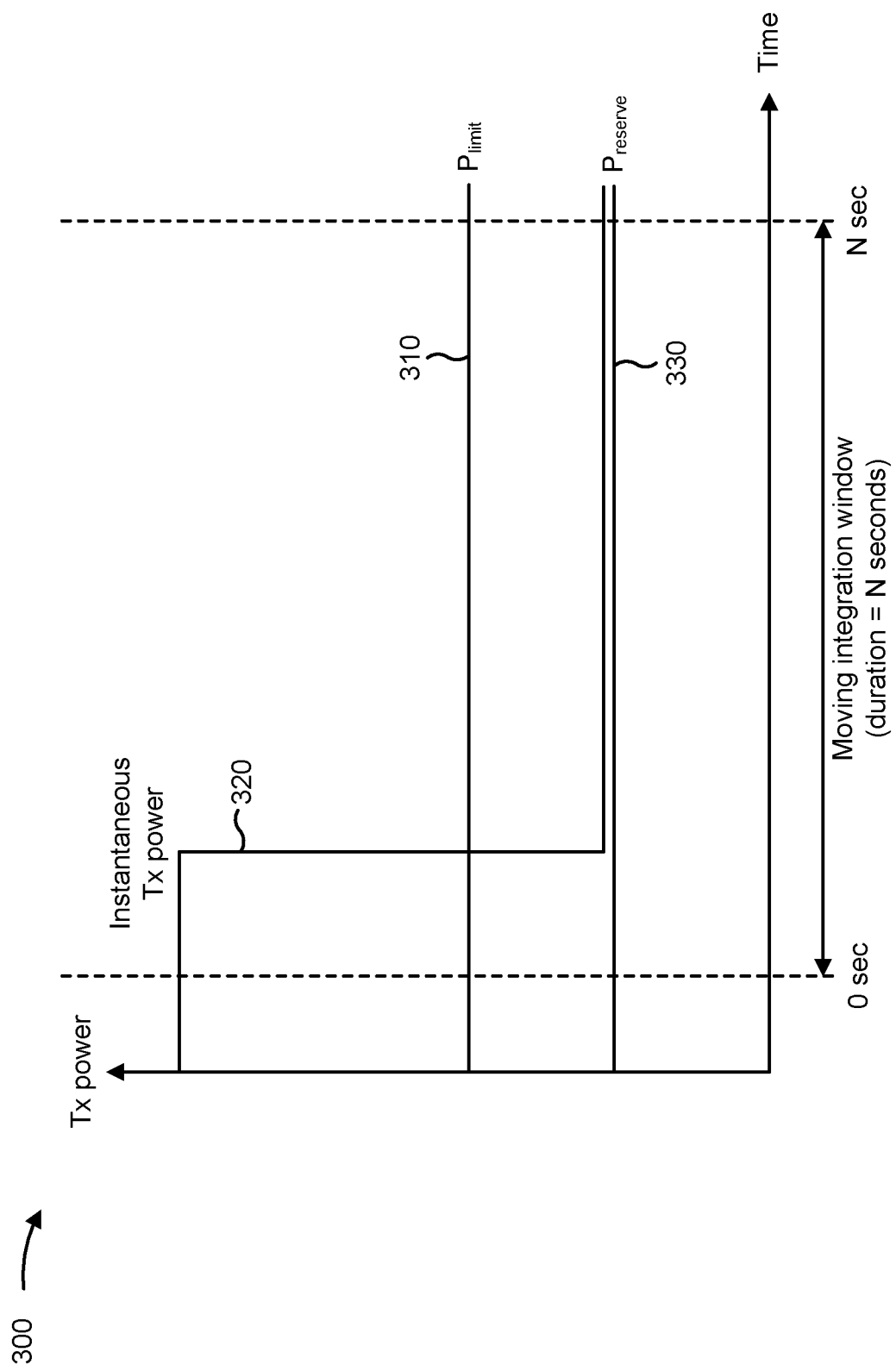
FIG. 3 is a diagram illustrating an example of a UE adapting transmit power over a moving integration window to satisfy one or more radio frequency (RF) radiation exposure limits, in accordance with the present disclosure.

FIG. 3 is a diagram illustrating an example 300 of a UE adapting transmit power over a moving integration window to satisfy one or more radio frequency (RF) radiation exposure limits, in accordance with the present disclosure.

Because UEs may emit RF waves, microwaves, and/or other radiation, UEs are generally subject to regulatory RF safety requirements that set forth specific guidelines, or exposure limits, that constrain various operations that the UEs can perform. For example, RF emissions may generally increase when a UE is transmitting, and the RF emissions may further increase in cases where the UE is performing frequent transmissions, high-power transmissions, or the like. Accordingly, because frequent and/or high-power transmission may lead to significant RF emissions, regulatory agencies (e.g., the Federal Communications Commission (FCC) in the United States) may provide information related to acceptable RF radiation exposure when UEs are communicating using different radio access technologies.

In some examples, RF exposure may be expressed in terms of a specific absorption rate (SAR), which measures energy absorption by human tissue per unit mass and may have units of watts per kilogram (W/kg). For example, when a UE is communicating using a RAT that operates in a frequency range below 6 GHz, the applicable RF exposure parameter may include the SAR. In particular, SAR requirements generally specify that overall radiated power by a UE is to remain under a certain level to limit heating that may occur when RF energy is absorbed. Because SAR exposure may be used to assess RF exposure for transmission frequencies less than 6 GHz, SAR exposure limits typically cover wireless communication technologies such as 2G/3G (e.g., CDMA), 4G (e.g., 3GPP Long Term Evolution (LTE)), certain 5G bands (e.g., NR in 6 GHz bands), IEEE 802.11ac, and other wireless communication technologies.

RF exposure may also be expressed in terms of power density (PD), which measures energy absorption per unit area and may be expressed in units of mW/cm². For example, when a UE is communicating using a RAT that operates in a high frequency range, such as a millimeter wave (mmW) frequency range, the applicable RF exposure parameter is PD, which may be regulated to limit heating of the UE and/or nearby surfaces. In certain cases, a maximum permissible exposure (MPE) limit in terms of PD may be imposed for wireless communication devices using transmission frequencies above 6 GHz. The MPE limit is a regulatory metric for exposure based on area, such as an energy density limit defined as a number, X, of watts per square meter (W/m²) averaged over a defined area and time-averaged over a frequency-dependent time window to prevent a human exposure hazard represented by a tissue temperature change. Because PD limits are typically used to assess RF exposure for transmission frequencies higher than 10 GHz, PD limits typically cover wireless communication technologies such as IEEE 802.11ad, 802.11ay, certain 5G bands (e.g., mmWave bands), and other wireless communication technologies.

Accordingly, different metrics may be used to assess RF exposure for different wireless communication technologies. UEs generally must satisfy all applicable RF exposure limits (e.g., SAR exposure limits or PD (e.g., MPE) exposure limits), which are typically regulatory requirements that are defined in terms of aggregate exposure over a certain amount of time, and the aggregate exposure may be averaged over a moving integration window (or moving time window), sometimes referred to as a compliance window. For example, as shown in FIG. 3, and by reference number 310, a UE may be subject to an average power limit ($P_{limit}$) that corresponds to an average power at which an SAR exposure limit and/or an MPE (e.g., PD) limit is satisfied if the UE were to transmit substantially continuously over a moving integration window of N seconds (e.g., 100 seconds). Accordingly, as shown by reference number 320, the UE can use an instantaneous transmit power that exceeds the average power limit for a period of time provided that the average power over the moving integration window is under the average power limit at which the MPE limit is satisfied. For example, the UE may transmit at a maximum transmit power at the start of the moving integration window and then reduce the instantaneous transmit power until the moving integration window ends to ensure that the MPE limit on aggregate exposure is satisfied over the entire moving integration window. In general, as shown by reference number 330, the UE may reduce the instantaneous transmit power to a reserve power level (Preserve), which is a minimum transmit power level to maintain a link with a base station.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, sub-6 GHz frequency bands of 5G, etc.) and a second wireless communication technology operating above 6 GHz (e.g., mmWave bands of 5G in 24 to 60 GHz bands, IEEE 802.11ad or 802.11ay). In certain cases, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. By way of example, a UE may include multiple radios, modules, and/or antennas (referred to collectively herein simply as radios for convenience) corresponding to multiple RATs and/or frequency bands, which may be more readily understood with reference to FIG. 4. Since the UE is required to satisfy all applicable RF exposure parameters, the UE may be subject to both SAR and MPE limitations, or may be subject to different RF exposure parameters for different radios, modules, or antenna bands, as described elsewhere herein.

As indicated above, FIG. 3 is described as an example. Other examples may differ from what is described with regard to FIG. 3.

Figure 4:
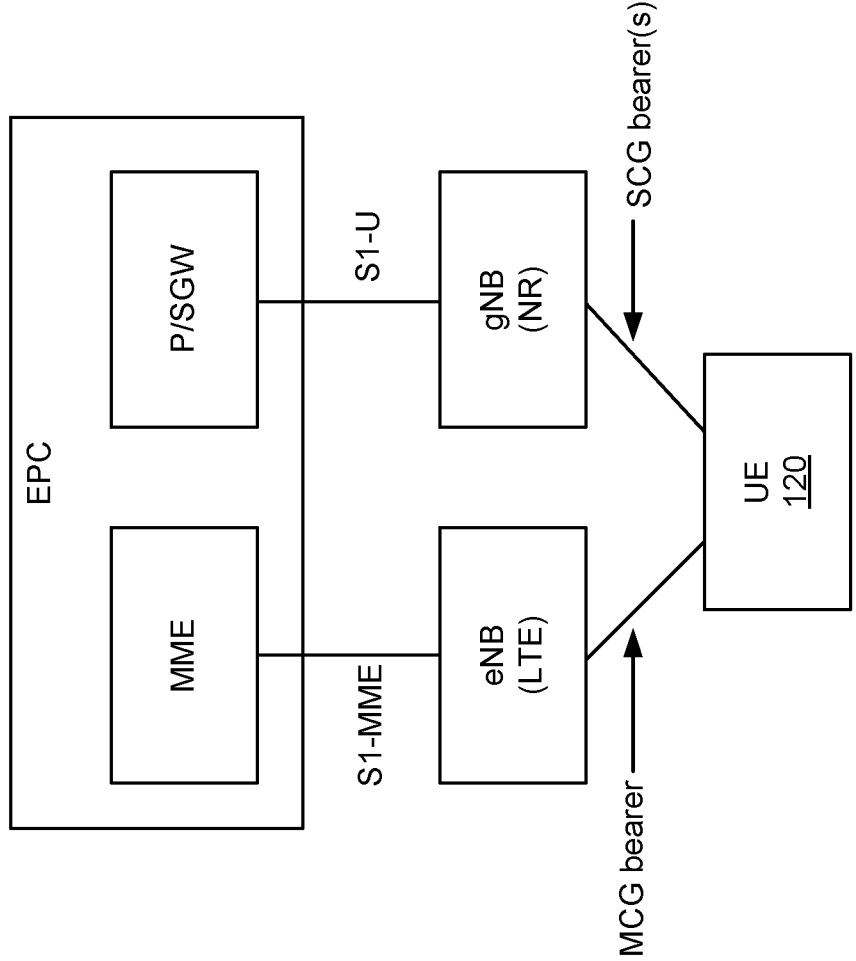
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. The ENDC mode is sometimes referred to as an NR or 5G non-standalone (NSA) mode. The ENDC mode is provided as one example of a scenario where a UE may implement multiple RAT technologies simultaneously, and thus may need to account for the RF exposure contribution of each RAT when satisfying any applicable RF exposure compliance limits. However, the described ENDC mode is provided merely as an example in which aspects of the technology may be employed, and in other aspects other dual connectivity modes and/or other multi-RAT communication technologies may be employed without departing from the scope of the disclosure.

In the ENDC mode, a UE 120 communicates using an LTE RAT on a master cell group (MCG), and the UE 120 communicates using an NR RAT on a secondary cell group (SCG). In some aspects, the UE 120 may communicate using dedicated radios, modules, and/or antennas (referred to collectively as radios for convenience) corresponding to the multiple RATs. For example, for the ENDC mode, the UE 120 may communicate via the LTE RAT using a first radio, and the UE 120 may communicate via the NR RAT using a second radio. Moreover, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). Furthermore, aspects described herein may apply to a mode where the UE 120 communicates, in addition to or instead of using one or both or the LTE RAT and/or NR RAT, via one or more additional communication technologies, such as Wi-Fi, Bluetooth, IEEE 802.11ad, 802.11ay, or the like. Thus, as used herein, "dual connectivity mode" may refer to an ENDC mode, an NEDC mode, an NRDC mode, and/or another type of dual connectivity mode (e.g., communications using two or more connections via 2G, 3G, 4G, 4G LTE, 5G NR, 6G, Wi-Fi, Bluetooth, IEEE 802.11ad, 802.11ay, etc.).

Returning to the ENDC example, and as shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

Again, although the example 400 depicted in FIG. 4 depicts an ENDC mode as one example of how a UE 120 may utilize more than one radio and/or RAT, the disclosure is not so limited, and in other aspects the UE 120 may employ two or more radios differently than the manner described in connection with FIG. 4. For example, a UE may include multiple radios corresponding to multiple RATs and/or frequency bands. For example, the UE may be capable of communicating using various RATs, such as 2G, 3G, 4G, 4G LTE, 5G NR, 6G, Wi-Fi, Bluetooth, IEEE 802.11ad, and/or 802.11ay. Additionally, or alternatively, the UE may be capable of communication on various frequency bands within a RAT (e.g., FR1, FR2, FR3, FR4a, FR4-1, FR4, and/or FR5). For each RAT and/or frequency band, the UE may include a corresponding radio configured to communicate on that RAT and/or frequency band. Moreover, in some cases, a UE may be configured to communicate using two or more radios concurrently. For example, a UE may communicate over 5G NR while simultaneously communicating via Bluetooth or a similar RAT. As another example, the UE may communicate using multiple component carriers, such as via one or more component carriers using a first radio and via one or more other component carriers using a second radio. In such instances, each individual radio may use a certain level of allocated power to transmit communications, and collectively the transmitting radios must satisfy any applicable SAR exposure and/or MPE (e.g., PD) limitations. Thus, the techniques described herein provide power control for a plurality of communication links. A communication link can be associated with a radio, a RAT, a connection of a dual connectivity (DC) mode, a component carrier, a combination thereof, or the like. For example, the techniques defined herein may provide power control for a first radio using a first RAT, a second radio using a second RAT, a third radio associated with a first component carrier of a given RAT, a fourth radio associated with a second component carrier of the given RAT, and so on.

When a UE is transmitting using more than one radio, the SAR and/or MPE contributions from each radio must collectively remain under the applicable SAR and/or MPE limits. Accordingly, for a given timeframe or compliance window, a UE may allocate a portion of the total energy available for transmission (e.g., the total energy that can be utilized by the UE while remaining under the applicable SAR and/or MPE limits) to each radio such that, collectively, the radios will not exceed the applicable SAR and/or MPE limits. Put another way, for given SAR exposure and PD limits (e.g., represented as $SAR_{lim}$ and $PD_{lim}$), the sum of the normalized SAR exposure and/or PD contributions of each radio (e.g., the SAR exposures and/or PD contribution of the radio, represented as $SAR_i$ and/or $PD_i$, divided by the applicable SAR exposure and/or PD limit, represented as $SAR_{lim}$ and/or $PD_{lim}$) must be less than or equal to one. Assuming that SAR exposure limits are applicable to radios operating in frequency bands below 6 GHz, and that MPE (e.g., PD) limits are applicable to radios operating in frequency bands above 6 GHz, the applicable SAR exposure and/or PD limits can be summarized as shown in the following equation:

$$\sum_{i=100kHz}^{6GHz} \frac{SAR_i}{SAR_{lim}} + \sum_{i=6GHz}^{300GHz} \frac{PD_i}{PD_{lim}} \le 1.$$

To maintain power output of a UE such that the UE satisfies the above condition, a total transmission energy available to the UE for a given transmission timeframe or compliance window is allocated among the various radios so that, if the radios transmit simultaneously, the collective power output remains under the applicable SAR exposure and/or MPE (e.g., PD) limits. Allocating transmission energy in this way may be inefficient, however, because the transmission energy requirement for each radio varies over time and thus may vary within the transmission timeframe or compliance window. Thus, a radio to which only a relatively small amount of energy is allocated may experience periods during the transmission timeframe when the radio does not have enough energy allocated to perform the radio's scheduled transmissions. This may be particularly problematic for radios attempting to transmit high priority communications such as, for example, control information, voice services such as voice over internet protocol (VoIP), video services such as videotelephony and/or video-conferencing, or the like, for which a shortage of transmission energy may result in disruption of service or even link failure. Moreover, a shortage of transmission energy may result in certain radios being unable to send low priority, best effort information even when transmission energy is available for the radio to do so but the energy is assigned to another radio not requiring the energy at that time.

Conversely, a radio to which a relatively high amount of energy is allocated for a given timeframe or compliance window may experience periods when the radio is not transmitting or else is not transmitting large amounts of information. Thus, much of the transmission energy allocated to the radio may go unused. Moreover, certain radios may use the transmission energy allocated to them to transmit low priority, best effort information at the expense of other radios not being provided enough transmission energy to transmit high priority information such as control information, VoIP, video-conferencing information, or similar information. Furthermore, the determination of an appropriate energy allocation for a communication link may involve information determined by a transmitter and information determined by a medium access control (MAC) entity of the UE. If the MAC entity lacks information regarding available energy for transmission of best effort traffic, the MAC entity may be unable to effectively manage best effort traffic transmission, which may lead to decreased throughput, increased latency, and suboptimal usage of allocated energy.

Some techniques and apparatuses described herein provide dynamic energy reservation for a plurality of communication links, such as a plurality of radios or the like. The dynamic energy reservation may provide sufficient transmit power to support high priority and control traffic while maintaining SAR, MPE, or other applicable RF exposure metrics under applicable compliance limits. A UE may allocate an amount of energy for a communication link, which may include at least as much energy as the dynamic energy reservation for the communication link. A transmitter to which the amount of energy is allocated may report remaining energy (after the dynamic energy reservation is accounted for) to a MAC entity of the UE, such that the MAC entity can adjust a transmit data buffer status. In this way, the UE can ensure that high priority traffic, such as control traffic and certain data communications, have sufficient energy for transmission. Furthermore, the MAC entity can selectively throttle best effort traffic using a buffer status based at least in part on remaining energy for the best effort traffic after the high priority traffic is accounted for. As a result, the UE more efficiently allocates transmission energy resources while remaining within applicable SAR exposure and/or MPE (e.g., PD) limits, resulting in increased throughput, decreased latency, and more reliable service.

As indicated above, FIG. 4 is provided as an example. Other examples may differ from what is described with respect to FIG. 4.

Figure 5:
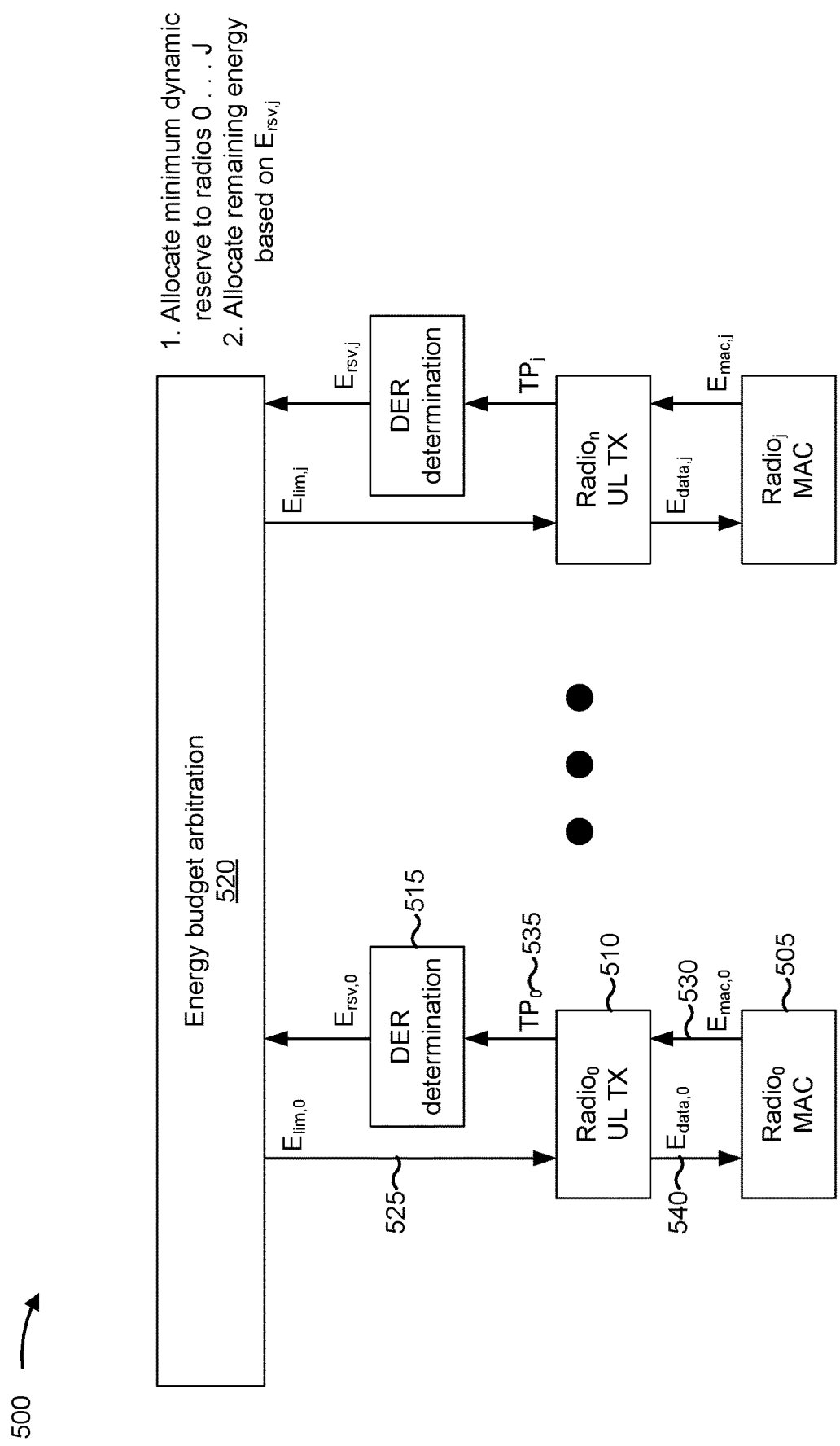
FIG. 5 is a diagram illustrating an example of energy budget determination based at least in part on a dynamic energy reserve, in accordance with the present disclosure.

FIG. 5 is a diagram illustrating an example 500 of energy budget determination based at least in part on a dynamic energy reserve, in accordance with the present disclosure. The operations of example 500 may be performed by a UE (e.g., UE 120). The operations of example 500 relate to a set of J communication links, where J is greater than or equal to 1. In FIG. 5, the J communication links correspond to J radios of the UE. Each radio of the UE is associated with a MAC entity (such as shown by reference number 505), an uplink transmitter (such as shown by reference number 510), and a dynamic energy reserve (DER) determination component (such as shown by reference number 515). Furthermore, the UE is associated with an energy budget arbitration component 520. The operations of example 500 are primarily described with regard to a first communication link associated with a first radio (shown as $Radio_0$), though these operations can be applied for any number of communication links. A radio can be associated with a particular antenna group, a particular RAT, a particular frequency range, or a combination thereof. For example, a first radio can be associated with an LTE RAT and antenna group (AG) 0, meaning that the first radio transmits and receives LTE communications via AG0. A second radio can be associated with FR1 and AG0, meaning that the second radio transmits and receives communications in FR1 (e.g., NR communications) via AG0. A third radio can be associated with an LTE RAT and AG1, meaning that the third radio transmits and receives LTE communications via AG1.

The energy budget arbitration component 520 may identify an available energy for uplink transmission of the J communication links. For example, each communication link may be configured with an available energy for uplink transmission. The available energy may be referred to as a maximum energy limit or as a first energy allocation. The available energy for a given communication link may be represented by $E_{lim,j}$. As shown by reference number 525, the energy budget arbitration component 520 may provide, to each uplink transmitter, information indicating the available energy for a communication link associated with each uplink transmitter. The available energy may be for a transmission interval. For example, the transmission interval may be a current and/or future time interval. The available energy may be based at least in part on an MPE requirement, an SAR requirement, or the like.

In some aspects, the available energy may be based at least in part on a control traffic parameter (represented herein by $TP_j$) associated with the communication link. Additionally, or alternatively, the available energy may be based at least in part on a requested amount of energy (represented herein by $E_{mac,j}$) associated with the communication link. For example, the available energy may be based at least in part on a DER request (shown as $E_{rsv,j}$) for the communication link, and the DER request may be based at least in part on the requested amount of energy and/or the control traffic parameter, as described below. In some aspects, a DER request may be specific to an antenna group. For example, each radio (e.g., each communication link) may provide a DER request per antenna group associated with each radio. In some aspects, the first energy allocation may be based at least in part on past energy usage, such as past energy usage for traffic associated with a threshold priority (e.g., as represented by $E_{mac,j}$), as described below. The energy budget arbitration component 520 may prioritize DER requests over requests for lower priority energy for the purpose of the first energy allocation. For example, when determining the first energy allocation for each communication link, the energy budget arbitration component 520 may first allocate sufficient energy to satisfy DER requests for each radio. Then, the uplink transmitter may allocate any leftover energy of the first energy allocation, after DER requests are satisfied, for best effort communication (e.g., communication with lower than a threshold priority).

For example, the DER determination component may determine an amount of energy to support communications associated with a threshold priority level (e.g., control communications, high priority communications, or the like). In some aspects, the DER determination component may modify the amount of energy for the DER request. For example, the DER request may indicate an increased amount of energy relative to the determined amount of energy to support communications associated with a threshold priority level. In some aspects, the DER determination component may increase the amount of energy to satisfy a minimum value (referred to as a lower bound and described in more detail below). For example, the lower bound may be configured to support communications associated with the threshold priority level (e.g., to provide at least enough energy to perform the communications associated with the threshold priority level). In some aspects, the DER determination may add a margin of energy for the DER request. In some aspects, the energy budget arbitration component 520 may subtract the increased margin (e.g., may use only the initially determined amount of energy) for purposes of allocating energy for determination of $E_{data}$ (described below). In some other aspects, the energy budget arbitration component 520 may use the increased amount of energy for purposes of allocating energy for determination of $E_{data}$.

In some aspects, the energy budget arbitration component 520 may determine an available energy based at least in part on a priority associated with a communication link. For example, different communication links (e.g., radios) may be associated with different priorities. If a total transmit power of the UE is not sufficient to satisfy DER requests and/or best effort transmissions of all communication links of the UE, then the energy budget arbitration component 520 may determine available energy based at least in part on the priority. For example, the energy budget arbitration component 520 may first allocate energy to satisfy DER requests of communication links in order of priority of the communication links. The energy budget arbitration component 520 may then allocate remaining energy based at least in part on the priority, such as based at least in part on past energy usage of the radios or the like.

The DER determination component for a communication link j may determine a DER request (shown as $E_{rsv,j}$). In some aspects, $E_{rsv,j}$ may represent an amount of energy requested in the DER request. The DER request may be based at least in part on one or more control traffic parameters of the communication link and/or a requested amount of energy associated with the communication link. For example, the requested amount of energy may be requested by the MAC entity, as shown by reference number 530. In some aspects, the one or more control traffic parameters may include a physical uplink control channel (PUCCH) transmit power (e.g., a transmit power required for PUCCH transmission, such as for PUCCH transmission at a threshold reliability), a PUCCH transmit time, a PUCCH transmit duty cycle (which may indicate times at which the UE is permitted to transmit a PUCCH and/or times at which the UE is not permitted to transmit a PUCCH), or the like. Additionally, or alternatively, the one or more control traffic parameters may include a random access channel (RACH) transmit power ramp counter, a RACH preamble power (e.g., a RACH preamble target power), a sounding reference signal channel (e.g., an SRS power indicating a power at which an SRS is transmitted, an SRS duration indicating a duration in which an SRS is transmitted, an SRS duty cycle indicating a duty cycle with which an SRS is transmitted), a RACH preamble duration, or the like.

In some aspects, $E_{rsv,j}$ may be computed as $E_{rsv,j} = E_{ctrl,j} + E_{mac,j}$. $E_{ctrl,j}$ may be equal to $E_{cch,j} + E_{rach,j}$, where $E_{cch,j}$ represents a PUCCH energy reservation (such that sufficient energy is reserved to support PUCCH transmission), and $E_{rach,j}$ represents a RACH energy reservation (such that sufficient energy is reserved to support RACH transmission). $E_{ctrl,j}$ may be computed based at least in part on the control traffic parameters $TP_j$, which may reflect dynamic actual channel and traffic conditions, as described elsewhere herein. In some aspects, $E_{cch,j} = P_{cch,j} * DC_{cch,j}$, where $P_{cch,j}$ represents a PUCCH transmit power for the PUCCH. The PUCCH transmit power for the PUCCH may depend on pathloss, a number of resource blocks of the PUCCH, channel conditions, or the like. The PUCCH transmit power may be obtained by measurement by the UE, a table lookup (e.g., based at least in part on pathloss), calculations based at least in part on RRC messages from a base station, or the like. $DC_{cch,j}$ may represent the PUCCH duty cycle, which can be a filtered value based at least in part on actual measurement, or which can be calculated based at least in part on RRC messages from the base station. $E_{rach,j}$ may be a function of one or more of a RACH preamble ramping counter, a valid RACH opportunity bitmap, a $P_{PRACH,target,i}$ value, a preamble duration, or the like. For example, the function may output a required energy to reserve for a next transmission interval based at least in part on the parameters, $TP_j$, described elsewhere herein. In some aspects, one or more of the energy reservations or transmit powers described above (e.g., $E_{rsv,j}$, $E_{ctrl,j}$, $E_{mac,j}$, $P_{cch,j}$, or the like) may be normalized. For example, one or more of the energy reservations or transmit powers described above may be normalized using an antenna input power limit ($P_{lim}$) value of the UE. The antenna input power limit may indicate a maximum transmit power of the UE. To normalize a transmit power, the UE may divide the transmit power by $P_{lim}$. To normalize an energy value, the UE may divide a transmit power derived from the energy value by $P_{lim}$.

In some aspects, the DER request may be based at least in part on (or may be interpreted or modified based at least in part on) a lower bound and/or a higher bound. The lower bound may be referred to as (or may be based on) a minimum DER, and the higher bound may be referred to as a maximum DER. In some aspects, the lower bound and/or the higher bound may be applied at the energy budget arbitration component 520. For example, the energy budget arbitration component 520 may receive a DER request and may modify the DER request such that the DER request complies with one or more of the lower bound or the upper bound. As another example, the energy budget arbitration component 520 may determine the available energy (as provided at reference number 525) for each radio such that each radio of the UE has at least an available energy that complies with the lower bound. In some aspects, the energy budget arbitration component 520 may then allocate remaining energy based at least in part on a priority of each radio and the DER requests of each radio. In some aspects, the lower bound and/or the higher bound for a given radio may be applied at the DER determination component of the given radio (e.g., the given radio may determine $E_{rsv,j}$ in compliance with one or more of the lower bound or the higher bound, such that $E_{rsv,j}$ is between the lower bound and the higher bound, if both are applied).

In some aspects, the lower bound may be configured, such as by an original equipment manufacturer (OEM) of the UE. In some aspects, the lower bound may be configured per service type (e.g., a radio providing a voice service may be configured with a higher lower bound than a radio providing a data service). Additionally, or alternatively, the lower bound may be configured per antenna group of the UE (for example, the lower bound may be based at least in part on an SAR limitation associated with an antenna group). In some aspects, the lower bound may be a function of a total minimum reserve and a number of active radios of the UE. In some aspects, the lower bound may be based at least in part on a service type. For example, the lower bound may be derived from the service type. In some aspects, the lower bound (or the minimum DER) may be requested by a radio. In some aspects, the total minimum reserve may represent the sum of minimum DERs across all supported service types and all active radios. Thus, in some aspects, the total minimum reserve may provide an amount of energy, across all active radios, to support communications associated with a threshold priority level. In some aspects, the total minimum reserve may be evenly split among the active radios based at least in part on the number of active radios. For example for a UE with J active radios, the lower bound for a given radio may be determined as (total minimum reserve)/J. In some aspects, the total minimum reserve may be allocated among the number of active radios (e.g., using an uneven split). Allocating the total minimum reserve may include determining a lower bound for each radio (e.g., each active radio) of the UE. For example, the total minimum reserve may be allocated based at least in part on whether a given radio is associated with an anchor status. An anchor status may indicate whether the given radio facilitates communication on an anchor carrier or a non-anchor carrier (e.g., a higher lower bound may be allocated for a radio facilitating an anchor carrier than for a radio facilitating a non-anchor carrier). As another example, the total minimum reserve may be allocated based at least in part on a window size or window configuration of a given radio, such as a size of a compliance window (e.g., a higher portion of a total minimum reserve may be allocated for radios associated with a same window size, whereas a lower portion of the total minimum reserve may be allocated for radios associated with different window sizes). As yet another example, the total minimum reserve may be allocated based at least in part on RF conditions for a given radio (such as coverage, link quality, signal strength, or the like). As still another example, the total minimum reserve (or a lower bound or minimum DER) may be allocated based at least in part on usage of a given radio (such as energy usage). For example, the total minimum reserve (or a lower bound or minimum DER contributing to a total minimum reserve) may be allocated based at least in part on historical and/or current energy usage of the given radio. As yet another example, the total minimum reserve may be allocated based at least in part on a type of radio of a given radio (e.g., Bluetooth, WiFi, mmW, Sub6, low-power, or the like). In some aspects, a radio's lower bound may be adjusted based at least in part on real time usage of the radio. In some aspects, the total minimum reserve may be allocated based at least in part on a user configuration specifying a portion of the total minimum reserve that should be allocated to one or more radios. In some aspects, the lower bounds (e.g., minimum DERs) may be implemented in the absence of a total minimum reserve. For example, each radio may be configured with a respective lower bound (e.g., minimum DER) without reference to a total minimum reserve, and the energy budget arbitration component 520 may determine available energy for each radio based at least in part on the respective lower bound (e.g., minimum DER).

As mentioned above, in one or more transmit intervals, the energy budget arbitration component 520 may determine available energy for each radio based at least in part on the DER requests of each radio. For example, the energy budget arbitration component 520 may receive the DER requests of each radio. The energy budget arbitration component 520 may determine a lower bound and/or an upper bound for each radio (e.g., before receiving the DER requests or after receiving the DER requests). The energy budget arbitration component 520 may apply the determined lower bound and/or the upper bound for each DER request (e.g., for radio j, the energy budget arbitration component 520 may apply a lower bound and/or an upper bound associated with radio j to a DER request associated with radio j). In some aspects, the energy budget arbitration component 520 may guarantee the lower bound for each radio (e.g., each active radio), and then may allocate an amount of remaining energy (after the lower bound is allocated) based at least in part on priorities of the radios. Thus, a minimum amount of energy is guaranteed for each radio such that a high priority radio does not take all of the available energy of the UE. Furthermore, the lower bound ensures that even a lower priority radio has sufficient energy for service of the lower priority radio, which protects from dropped calls and improves throughput and reliability.

$E_{mac,j}$ may be referred to as a MAC requested high priority traffic energy reservation or a requested amount of energy. It should be noted that $E_{mac,j}$ can originate from an entity other than a MAC entity of the UE. In some aspects, $E_{mac,j}=P_{target,j}*DC_{mac,j}$. In some aspects, $E_{mac,j}$ may be normalized using $P_{lim}$ (e.g., $E_{mac,j}=P_{target,j}/P_{lim,j}*DC_{mac,j}$). In some aspects, $P_{target,j}$ may represent a UE transmit power for MAC requested high-priority traffic. For example, the UE transmit power may include a measured actual transmit power, a filtered value based at least in part on a measured transmit power (e.g., a Layer 3 filtered value, a weighted average, a moving average, or the like), a table lookup value (such as based at least in part on pathloss), a calculated value based at least in part on RRC messages, or the like. In some aspects, $P_{target,j}$ may additionally or alternatively be based at least in part on a type of traffic to be transmitted. For example, $P_{target,j}$ may be based at least in part on a service (such as VoIP, a gaming service, an emergency service), a latency requirement associated with a service, a reliability requirement associated with a service, or the like. In such examples, the UE may increase the $P_{target,j}$ to increase the received signal-to-noise ratio at the base station, and thus improve the quality of service or quality of experience service. In some aspects, $P_{target,j}$ may be based at least in part on an antenna port input power limit for compliance. For example, $P_{target,j}$ may represent a MAC requested target power used to close the link of VoIP or VoLTE traffic divided by an antenna port input power limit for compliance. $DC_{mac,j}$ may represent an estimated transmit duty cycle of the MAC requested high-priority traffic on uplink transmitter j, which may include a measured high-priority traffic duration, a filtered value based at least in part on a measured high-priority traffic duration, or the like.

In some aspects, the MAC entity may request an amount of energy to provide a threshold transmission power (e.g., $P_{target,j}$) throughout a transmission interval. For example, the MAC entity may be associated with a mode in which the MAC entity requests the amount of energy to provide the threshold transmission power throughout a transmission interval. In the mode, the MAC entity may request for the DER determination component to request additional energy via the DER request, such that the UE can transmit at $P_{target,j}$ throughout the transmission interval. Thus, reliability and received strength of uplink communications can be improved.

As shown by reference number 535, the DER determination component for a given communication link may receive the one or more control traffic parameters from an uplink transmitter of the given communication link. As shown by reference number 525, the uplink transmitter may receive information indicating the available energy from the energy budget arbitration component 520. The uplink transmitter may determine an uplink transmit power based at least in part on the available energy (not shown). For example, the uplink transmitter may determine an actual uplink transmit power based at least in part on $E_{lim,j}$. The uplink transmitter may also determine a second energy allocation for the communication link associated with the uplink transmitter (represented by $E_{data,j}$, and shown by reference number 540). For example, the second energy allocation may indicate an amount of energy available for transmission of communications other than communications associated with a threshold priority. In some aspects, the second energy allocation may be for best effort traffic and the first energy allocation may be for transmissions associated with a priority that satisfies a threshold (such as control communications, high priority data communications, or the like). In some aspects, the second energy allocation may be determined by subtracting the amount of energy indicated by the DER request from the first energy allocation.

The MAC entity may determine the requested amount of energy $E_{mac,j}$. In some aspects, the MAC entity may determine the requested amount of energy based at least in part on a transmit power for traffic associated with a priority and/or a duty cycle associated with the traffic associated with the priority.

The MAC entity may throttle uplink transmission based at least in part on the second energy allocation $E_{data,j}$. For example, the MAC entity may compute an uplink traffic buffer status based at least in part on the second energy allocation. If the second energy allocation fails to satisfy a threshold (e.g., is lower than a threshold, does not provide sufficient energy for transmission of a set of best effort traffic), then the MAC entity may determine to throttle the best effort traffic. The MAC entity may determine a diminished buffer status based at least in part on the second energy allocation failing to satisfy the threshold. For example, the diminished buffer status may indicate a smaller amount of best effort traffic (e.g., data) than is actually available for transmission. The UE may transmit a buffer status report indicating the diminished buffer status. If no energy is available for the second energy allocation $E_{data,j}$ (e.g., if $E_{data,j}$ is equal to zero), then the UE may transmit a buffer status report indicating a zero buffer status, such that transmission of the best effort traffic is completely throttled. In such a case, if less than all of the reserved energy is used for communications associated with the threshold priority, then some amount of energy can be allocated to $E_{data,j}$ for best effort traffic.

Thus, in each transmission interval, the energy budget arbitration component 520 may receive DER requests and information regarding past energy usage associated with each communication link. The energy budget arbitration component 520 may determine the energy budget limit ($E_{lim}$) for each communication link in a next transmission interval. The energy budget limit may satisfy the DER requests from all communication links (if possible) and may satisfy MPE/SAR compliance. In each transmission interval, the uplink transmitter of each communication link may collect information included in $TP_j$ and may relay information included in $E_{mac,j}$ for determination of a DER. In each transmit interval, the uplink transmitter of each communication link may also determine the available energy limit for best-effort traffic data $E_{data,j}$, and may provide the available energy limit (e.g., the second energy allocation) to the MAC entity. As mentioned above, $E_{data,j}$ is a function of ($E_{lim,j} - E_{rsv,j}$), meaning that the remaining energy is for best-effort traffic. In each transmit interval, the DER determination component may determine the DER request based at least in part on $TP_j$ and $E_{mac,j}$ from the uplink transmitter, and may provide the DER request (e.g., $E_{rsv,j}$) to the energy budget arbitration component 520. As mentioned above, the MAC entity may determine $E_{mac,j}$ and may provide $E_{mac,j}$ to the uplink transmitter for a next transmission interval. The MAC entity may receive $E_{data,j}$ from the uplink transmitter, and may use $E_{data,j}$ to determine the uplink traffic buffer status. If $E_{data,j}$ is low (e.g., lower than a threshold), then the MAC entity may throttle the best-effort traffic data in the next transmission interval. The UE may transmit based at least in part on at least one of the first energy allocations (e.g., the energy budget limit) or the second set of energy allocations (e.g., $E_{data,j}$). For example, each radio of the UE may transmit communications associated with a priority that satisfies a threshold (e.g., control communications, data communications that satisfy the threshold) using energy of a first energy allocation, and any leftover energy after the transmission of the communications (e.g., the second energy allocation) may be used for other transmissions such as best effort transmissions.

As indicated above, FIG. 5 is provided as an example, other examples may differ from what is described with regard to FIG. 5.

Figure 6:
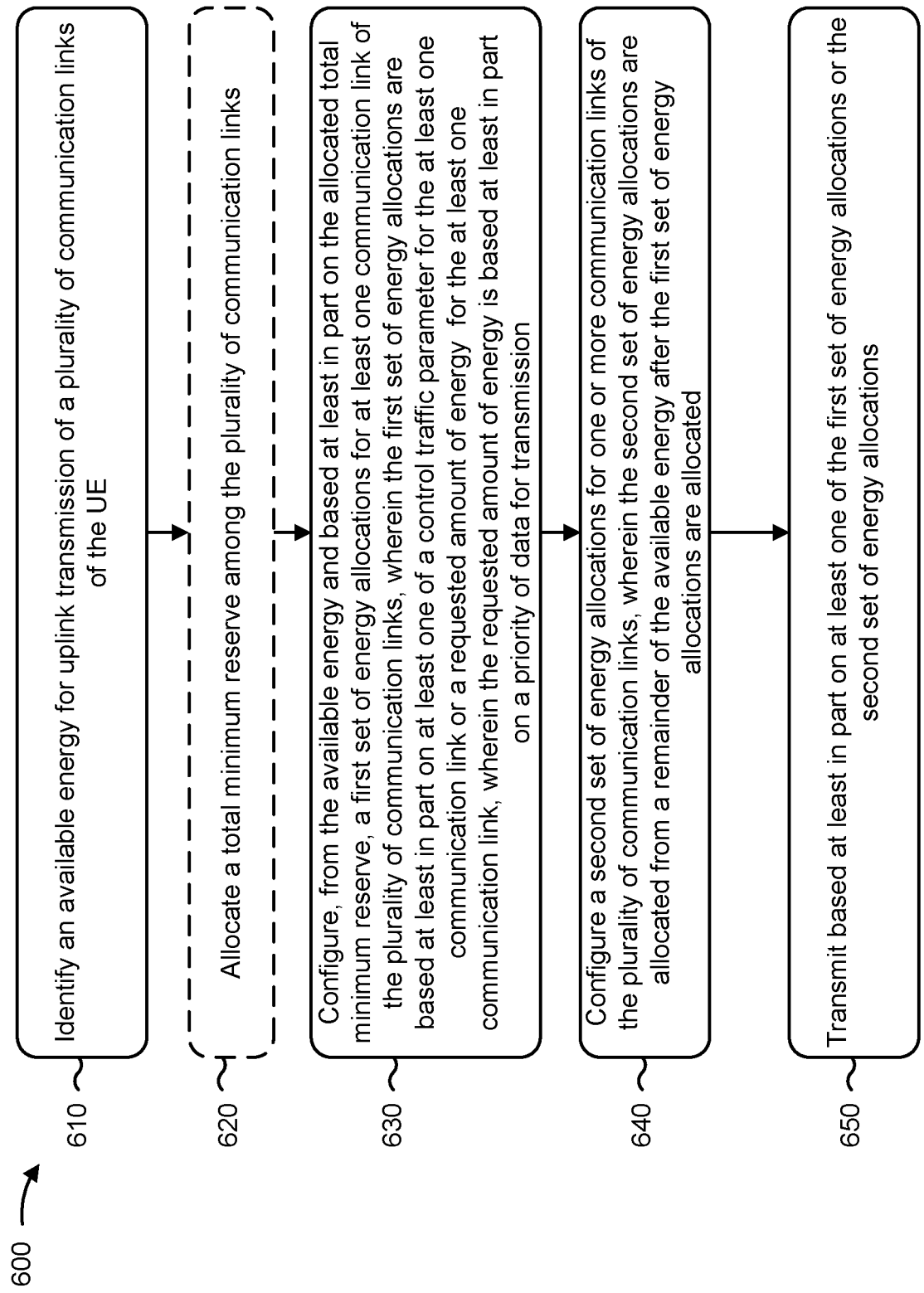
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with per communication link energy reservation.

As shown in FIG. 6, in some aspects, process 600 may include identifying an available energy for uplink transmission of a plurality of communication links of the UE (block

610). For example, the UE (e.g., using communication manager 140 and/or energy budget arbitration component 708, depicted in FIG. 7) may identify an available energy (e.g., $E_{lim,j}$) for uplink transmission of a plurality of communication links of the UE, as described above. In some aspects, each communication link of the plurality of communication links may correspond to an antenna group of the UE. For example, as described herein, a radio supporting an LTE connection and an NR connection may be said to share one antenna group, and thus may share an energy budget. In some other examples, the LTE connection and a radio supporting an NR connection may be associated with different antenna groups and may be allocated energy separately from one another according to the techniques described herein. In some aspects, the plurality of communication links may be associated with a single antenna group.

As further shown in FIG. 6, process 600 may optionally include allocating a total minimum reserve among the plurality of communication links (block 620). For example, the UE (e.g., using communication manager 140 and/or energy budget arbitration component 708, depicted in FIG. 7) may allocate a total minimum reserve among the plurality of communication links. For example, the UE may determine a lower bound for each communication link of the plurality of communication links. The lower bounds can be the same as one another, or may be different from one another. For example, the lower bounds may be determined according to techniques described in more detail in connection with FIG. 3. In some aspects, the total minimum reserve may be different for different antenna groups. For example, the UE may determine a first total minimum reserve for a first antenna group, a second total minimum reserve for a second antenna group, and so on. In some aspects, the number of active radios of the UE may be different for different antenna groups. In some aspects, the number of active radios of the UE may change over time.

As further shown in FIG. 6, in some aspects, process 600 may include configuring, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission (block 630). For example, the UE (e.g., using communication manager 140 and/or DER determination component 710, depicted in FIG. 7) may configure, from the available energy, a first set of energy allocations for at least one communication link of the plurality of communication links, wherein the first set of energy allocations are based at least in part on at least one of a corresponding control traffic parameter (e.g., $TP_j$) for the at least one communication link or a corresponding requested amount of energy (e.g., $E_{mac,j}$) for the at least one communication link, wherein the corresponding requested amount of energy is based at least in part on a priority of data for a transmission, as described above. In some aspects, the first set of energy allocations may be used to determine the available energy. For example, the DER determination component 710 may provide a DER request indicating a first energy allocation (e.g., a requested first energy allocation) (e.g., $E_{rsv,j}$) to the energy budget arbitration component 708. Based at least in part on the DER request, the energy budget arbitration component 708 may determine the available energy, as described elsewhere herein. In some aspects, an uplink transmitter component 712 may configure a first energy allocation. For example, the uplink transmitter component 712 may configure the transmission such that the first energy allocation is available for the transmission, and may provide, to a MAC entity of the UE, an indication of a second energy allocation. The energy budget arbitration component 708 may configure the first set of energy allocations based at least in part on the allocated total minimum reserve. For example, each energy allocation of the first set of energy allocations may comply with a corresponding lower bound allocated from the total minimum reserve.

As further shown in FIG. 6, in some aspects, process 600 may include configuring a second set of energy allocations for one or more communication links of the plurality of communication links, wherein the second set of energy allocations are allocated from a remainder of the available energy after the first set of energy allocations are allocated (block 640). For example, the UE (e.g., using communication manager 140 and/or uplink transmitter component 712, depicted in FIG. 7) may configure a second set of energy allocations (e.g., $E_{data,j}$) for one or more communication links of the plurality of communication links, wherein the second set of energy allocations are allocated from a remainder of the available energy after the first set of energy allocations are allocated, as described above. In some aspects, the energy budget arbitration component 708 and/or the uplink transmitter component 712 may configure the first set of energy allocations and/or the second set of energy allocations based at least in part on a maximum DER, sometimes referred to herein as a higher bound for the DER. For example, the energy budget arbitration component 708 may select an energy allocation of the first set of energy allocations to comply with the higher bound. As another example, the uplink transmitter component 712 may configure an energy allocation of the second set of energy allocations to comply with the higher bound.

As further shown in FIG. 6, in some aspects, process 600 may include transmitting based at least in part on at least one of the first set of energy allocations or the second set of energy allocations (block 650). For example, the UE (e.g., using communication manager 140 and/or transmission component 704, depicted in FIG. 7) may transmit based at least in part on at least one of the first set of energy allocations or the second set of energy allocations, as described above.

Process 600 may include additional aspects, such as any single aspect or any combination of aspects described below and/or in connection with one or more other processes described elsewhere herein.

In a first aspect, the available energy is based at least in part on an exposure limit, such as an SAR requirement or an MPE requirement.

In a second aspect, alone or in combination with the first aspect, the available energy includes a first available energy associated with a first communication link of the plurality of communication links and a second available energy associated with a second communication link of the plurality of communication links.

In a third aspect, alone or in combination with one or more of the first and second aspects, the first available energy is different than the second available energy.

In a fourth aspect, alone or in combination with one or more of the first through third aspects, a particular control traffic parameter, for a communication link of the plurality of communication links, is based at least in part on at least one of a PUCCH transmit power, a PUCCH transmit time, a PUCCH duty cycle, a RACH transmit power ramp counter, a RACH preamble target power, a sounding reference signal channel, or a RACH preamble duration.

In a fifth aspect, alone or in combination with one or more of the first through fourth aspects, the second set of energy allocations are associated with transmission of best-effort traffic.

In a sixth aspect, alone or in combination with one or more of the first through fifth aspects, the first set of energy allocations are associated with transmission of at least one of a control channel, or a data transmission associated with a threshold priority (e.g., a priority that satisfies a threshold).

In a seventh aspect, alone or in combination with one or more of the first through sixth aspects, a particular requested amount of energy, for a communication link of the plurality of communication links, is based at least in part on a request (e.g., a MAC requested high priority traffic target transmit power, represented by $E_{mac,j}$) generated by a medium access control entity associated with the communication link.

In an eighth aspect, alone or in combination with one or more of the first through seventh aspects, the first set of energy allocations are based at least in part on a plurality of priorities corresponding to the plurality of communication links.

In a ninth aspect, alone or in combination with one or more of the first through eighth aspects, process 600 comprises determining a buffer status based at least in part on the second set of energy allocations, wherein transmitting based at least in part on at least one of the first set of energy allocations or the second set of energy allocations is based at least in part on the buffer status.

In a tenth aspect, alone or in combination with one or more of the first through ninth aspects, a first energy allocation of the first set of energy allocations is based at least in part on a service associated with the UE.

In an eleventh aspect, alone or in combination with one or more of the first through tenth aspects, based at least in part on the UE being in a mode, the corresponding requested amount of energy is configured to provide a threshold transmit power for the uplink transmission throughout a time interval.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
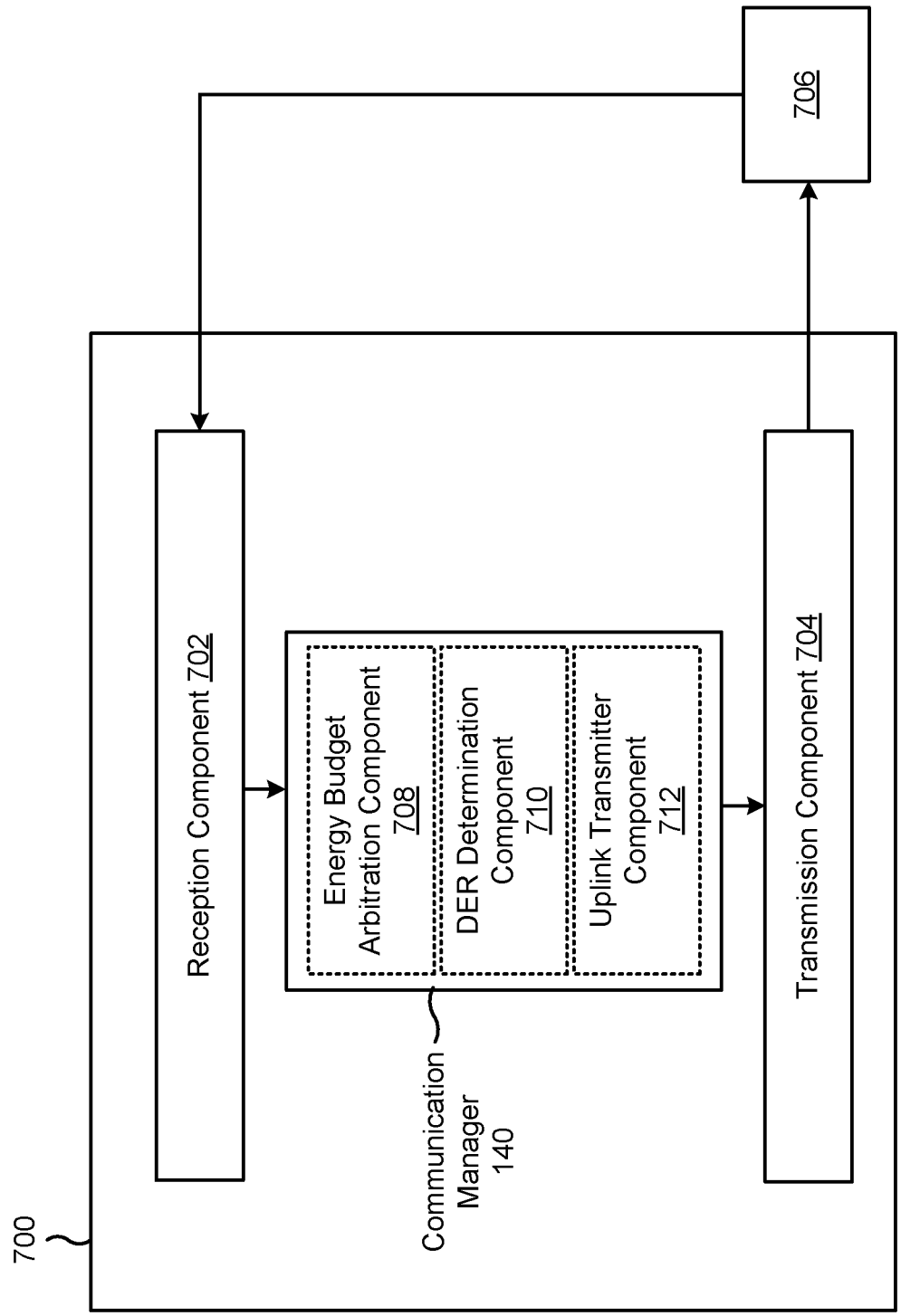
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of an energy budget arbitration component 708 (e.g., energy budget arbitration component 520 of FIG. 5), a DER determination component 710 (e.g., the DER determination component of FIG. 5), or an uplink transmitter component 712 (e.g., the uplink transmitter component 712 of FIG. 7), among other examples. In some aspects, the uplink transmitter component 712 may be, may be included in, or may include the transmission component 704.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The energy budget arbitration component 708 may identify an available energy for uplink transmission of a plurality of communication links of the UE. The DER determination component 710 may configure, from the available energy, a first set of energy allocations for the plurality of communication links, wherein the first set of energy allocations are based at least in part on at least one of a corresponding control traffic parameter or a corresponding requested amount of energy for each communication link of the plurality of communication links, wherein the corresponding requested amount of energy is based at least in part on a priority of a transmission. The uplink transmitter component 712 may configure a second set of energy allocations for one or more communication links of the plurality of communication links, wherein the second set of energy allocations are allocated from a remainder of the available energy after the first set of energy allocations are allocated. The transmission component 704 may transmit based at least in part on at least one of the first set of energy allocations or the second set of energy allocations.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Some techniques and apparatuses described herein provide a shared energy pool to be used to flexibly and dynamically allocate energy within a given transmission timeframe among the various radios and/or communication links of a UE such that the transmission energy available to the UE is more effectively utilized to support high priority and best effort traffic while maintaining SAR, MPE, or other applicable RF exposure metrics under applicable compliance limits. For example, in some aspects, a UE (e.g., a multi-radio UE) may initially allocate a portion of the total energy available for transmission (where the total energy available for transmission is sometimes referred to herein as an available energy) over a given transmission timeframe to one or more radios of the UE. Each of the one or more radios may then allocate a first portion of its allotted energy (sometimes referred to herein as a first energy allocation or a first set of energy allocations) to a first group of tasks, such as, in some aspects, high priority tasks including control tasks (e.g., physical control channel and/or upper layer control channel transmissions), VoIP communications, or the like. In some aspects, high priority tasks may be communications having a threshold priority value. The threshold priority value may be determined from a number of factors such as whether the application or service is time sensitive and/or requires a high grade of quality of service (QoS). In some aspects, certain physical channels such as a PUCCH, a RACH, or a channel carrying a sounding reference signal (SRS) may carry critical information which can impact DL and/or UL service quality and/or which may be needed to avoid link failure, and thus such communications may be regarded as high priority tasks. In addition, certain upper layer signaling messages related to radio link control (RLC) and/or transmission control protocol (TCP) may be considered high priority tasks. Disruption of such high priority tasks may have a noticeable impact on user experience and may cause link failure. Furthermore, in some aspects, the application layer may indicate certain communications or applications as high priority.

Each of the one or more radios may also allocate a second portion (sometimes referred to herein as a second energy allocation or a second set of energy allocations) of its allotted energy to a shared energy pool (sometimes referred to herein as a remainder of available energy after a first set of energy allocations are allocated, or as a remaining energy), which is available for use by each radio to perform certain low priority or best effort tasks (e.g., transmissions or communications in addition to the high priority transmissions or communications for which the first portion of the allotted energy was reserved). A task that is not considered a high priority task, as described above, is a low priority task. Thus, in some aspects low priority tasks may be communications having less than a threshold priority value. As each radio requires additional energy to perform low priority, best effort tasks, energy may be allocated from the shared amount of energy to support the transmission. Moreover, if a radio does not use all the energy allotted to it, the radio may indicate that the excess, unused energy may be added to the shared energy pool such that the energy is available to other radios for use during peaks of demand. In this way, the total transmission energy available to the UE is dynamically and flexibly accessible by the individual radios over a given timeframe, while keeping the UE under applicable cumulative SAR exposure and/or MPE (e.g., PD) limits. As a result, the UE more efficiently allocates transmission energy resources, allowing for higher transmission power limits for radios on an as needed basis while remaining within applicable SAR exposure and/or MPE (e.g., PD) limits, resulting in increased throughput, decreased latency, and more reliable service.

Some techniques and apparatuses described herein enable dynamic energy allocation from a shared amount of energy to each radio and/or communication link in a synchronous or asynchronous manner. The shared amount of energy may be a total amount of energy available for transmission over a given time interval after certain tasks (e.g., high priority tasks) are accounted for. In some aspects, the shared amount of energy may be dynamically allocated to one or more communication links based at least in part on energy demands or other factors. For example, in some aspects, a first communication link may be allocated energy to be used in a first time period and a second communication link may be allocated energy to be used in a second time period. Each of the energy allocations may come from or otherwise be based at least in part on the shared amount of energy. For synchronous implementations, the first time period may be the same as the second time period, while for asynchronous operations the first time period is different than the second time period. As a result, the UE more efficiently allocates transmission energy resources for a given timeframe while remaining within applicable SAR exposure and/or MPE (e.g., PD) limits, resulting in increased throughput, decreased latency, and more reliable service.

Figure 8:
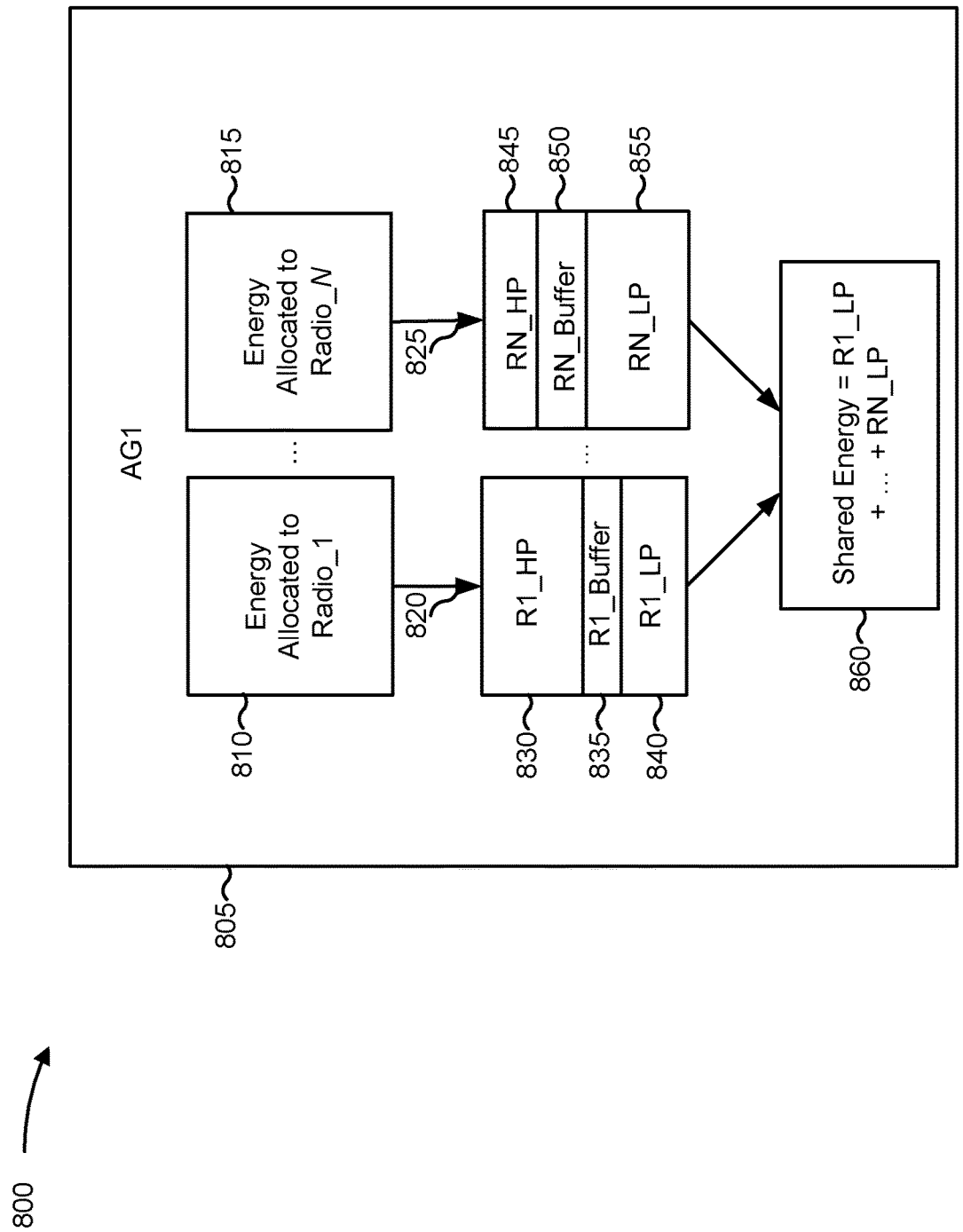
FIG. 8 is a diagram illustrating an example associated with allocating energy among various radios and/or communication links, in accordance with the present disclosure.

FIG. 8 is a diagram illustrating an example 800 associated with allocating energy among various radios and/or communication links, in accordance with the present disclosure.

In the example 800, a total amount of energy available to use for transmissions during a given transmission timeframe for an antenna group 805 (e.g., a first antenna group, shown as AG1) of a UE (e.g., UE 120) may be distributed and/or allocated among the various radios associated with the antenna group 805. The total amount of energy available may be referred to herein as an available energy for uplink transmission. The transmission timeframe is a length of time over which a corresponding energy usage is determined such that, if the total amount of energy were consumed during the timeframe, the antenna group would remain under any applicable RF exposure limits such as SAR exposure limits and/or MPE (e.g., PD) limits. In some aspects, if the amount of energy used for transmissions during the transmission timeframe exceeds the total amount of energy (e.g., a threshold total amount of energy), then the antenna group would exceed an RF exposure limit. In some aspects, the transmission timeframe may be a compliance window of one or more RF exposure compliance limits.

The antenna group 805 may be one of multiple antenna groups of the UE 120, and each antenna group may include one or more radios and/or antennas. For example, the antenna 252a of FIG. 2 may be categorized into a first antenna group, and the antenna 252r of FIG. 2 may be categorized into a second antenna group. In some aspects, an antenna can belong to multiple antenna groups. In some aspects, each antenna array (e.g., each phased array) is placed in a different antenna group. The groups may be defined manually (e.g., by a designer or test operator) or in an automated fashion (e.g., by an algorithm operating prior to initialization of the UE or at initialization or during operation of the UE). The groups may be established based at least in part on a physical location of antennas within the UE and/or according to a location of a user, relative to the UE, that may be exposed to RF radiation from the antenna. Additionally, or alternatively, the groups may be established based at least in part on an operating frequency, form factor, associated method of calculating RF exposure, or the like. In some aspects, the antenna groups may be defined and/or operated so as to be mutually exclusive in terms of RF exposure with any applicable RF exposure compliance metric (e.g., SAR and/or MPE), with the corresponding transmit power levels determined separately for each antenna group. Put another way, when determining whether a group of radios collectively remain under one or more applicable compliance limits, the RF transmissions from all radios belonging to a certain antenna group should be considered, while transmissions from other radios may not need to be considered. However, for a radio belonging to multiple antenna groups, the RF exposure from that radio may need to be considered for each antenna group to ensure that each antenna group remains under the applicable compliance limit(s).

In some aspects, the total amount of energy available for allocation among the various radios of the antenna group 805 corresponds to an amount of energy that is available to be fully used by the antenna group 805 and/or radios therein during the transmission timeframe while complying with any applicable RF exposure compliance limits, such as SAR exposure limits and/or MPE (e.g., PD) limits. The depicted antenna group 805 includes N radios (N greater than or equal to 1), each receiving a corresponding energy allocation for completing transmissions that cumulatively use up to (e.g., less than or equal to) the total amount of energy available to the antenna group for the transmission timeframe. For example, as indicated by reference numbers 810 and 815, an amount of energy is allocated to Radio_1 through Radio_N, respectively, of the multiple radios within the antenna group. Although for ease of description the examples will be described in terms of allocating the energy among the various radios, in some other aspects the energy can be allocated among various communication links without departing from the scope of the disclosure. The total amount of energy available to the antenna group 805 for transmission during a transmission timeframe may initially be allocated among the various radios (e.g., Radio_1 to Radio_N) using any number of techniques such as, for example, by equally distributing the amount of total available transmission energy among the radios, by allocating the transmission energy based at least in part on a radio type with certain types of radios initially receiving more energy than others, by allocating energy according to past energy usage and/or future expected energy usage of the radio, or the like. Moreover, the energy allocations to each radio may be normalized (e.g., the amount of allocated energy may be divided by a total energy available for the transmission timeline) without departing from the scope of the disclosure.

According to some aspects, each radio and/or communication link may further reallocate the initial allocation of energy indicated at reference number 810 and reference number 815 to be used to perform one or more transmission tasks. For example, and as generally indicated by reference number 820, the first radio may further allocate its initial energy allocation shown by reference number 810 into three different allocations: energy to be used for high priority tasks 830 (e.g., R1_HP), energy allocated to a high-priority buffer 835 (e.g., R1_Buffer), and energy allocated to be available, if needed, for use by other, low priority or "best effort" tasks 840 (e.g., R1_LP). Similarly, and as generally indicated by reference number 825, radio N may further allocate its total energy allocation shown by reference number 815 into energy to be used for high priority tasks 845 (e.g., RN_HP), energy allocated to a high-priority buffer 850 (e.g., RN_Buffer), and energy 855 allocated to be available, if needed, for use by other, low priority tasks (e.g., RN_LP).

As shown, the energy allocation may differ among the various radios, according to a variety of factors, such as an anticipated transmission energy usage for an upcoming time period for each radio, a historical transmission energy usage by each radio, a quality of the link used by each radio, or the like, as will be described more fully below. In the depicted example, Radio_1 has reserved a greater amount of energy for high priority tasks 830 than the amount of energy reserved by Radio_N for high priority tasks 845. The energy to be used for high priority tasks 830, 845 may represent a minimum amount of energy to sustain high priority tasks at the respective radios and/or respective communication links, such as VoIP calls, videotelephony and/or video-conferencing, control tasks, and similar transmissions. Moreover, each radio may allocate a portion of its energy to a high-priority buffer 835 and 850, respectively, which in some aspects is an additional amount of energy reserved by each radio to support high priority tasks, and which is accessed if the amount of energy reserved for high priority tasks (e.g., the amount of energy indicated by 830 and 845) is insufficient to carry out the high priority tasks. In some aspects, the energy allocated by each radio for high priority tasks (e.g., the energy indicated by reference numbers 810 and 815) may be combined into a shared amount of energy and/or a high priority energy pool from which the various radios (e.g., Radio_1, . . . , Radio_N) are allocated energy as they perform high priority tasks.

According to some aspects, the leftover energy, or low priority energy, at each radio (e.g., the energy remaining from each radio's respective allocation (reference numbers 810 and 815) after reallocating a portion thereof to the high priority tasks 830 and 845, respectively, and to any high-priority buffer 835 and 850, respectively, and to low-priority tasks indicated by reference numbers 840 and 855) is placed in a shared amount of energy, as indicated by reference number 860. Thus, in some aspects, the shared amount of energy 860 includes the sum of the energies allocated for low priority tasks by each radio (e.g., low priority energy 840 and low priority energy 855). By combining the leftover energy (e.g., the energy available for low priority tasks) in a shared amount of energy 860, the low priority energy can be efficiently reallocated to each radio based at least in part on real-time demand or the like. More particularly, when each radio requires additional energy to perform certain transmission tasks within the transmission timeframe, a portion of the energy within the shared amount of energy 860 may be distributed to the radio to perform the task, rather than each individual radio maintaining an individual reserve of energy, which, as described, may lead to energy allocation inefficiencies. In this regard, the total energy available for transmission under the applicable compliance limits (e.g., SAR and/or MPE) is efficiently and dynamically allocated among the various radios and/or communication links of the UE, even when energy needs within a transmission timeframe changes quickly due to, for example, gNB and/or eNB scheduling, RF conditions, nature of traffic, or the like.

As indicated above, FIG. 8 is provided as an example. Other examples may differ from what is described with regard to FIG. 8.

Figure 9:
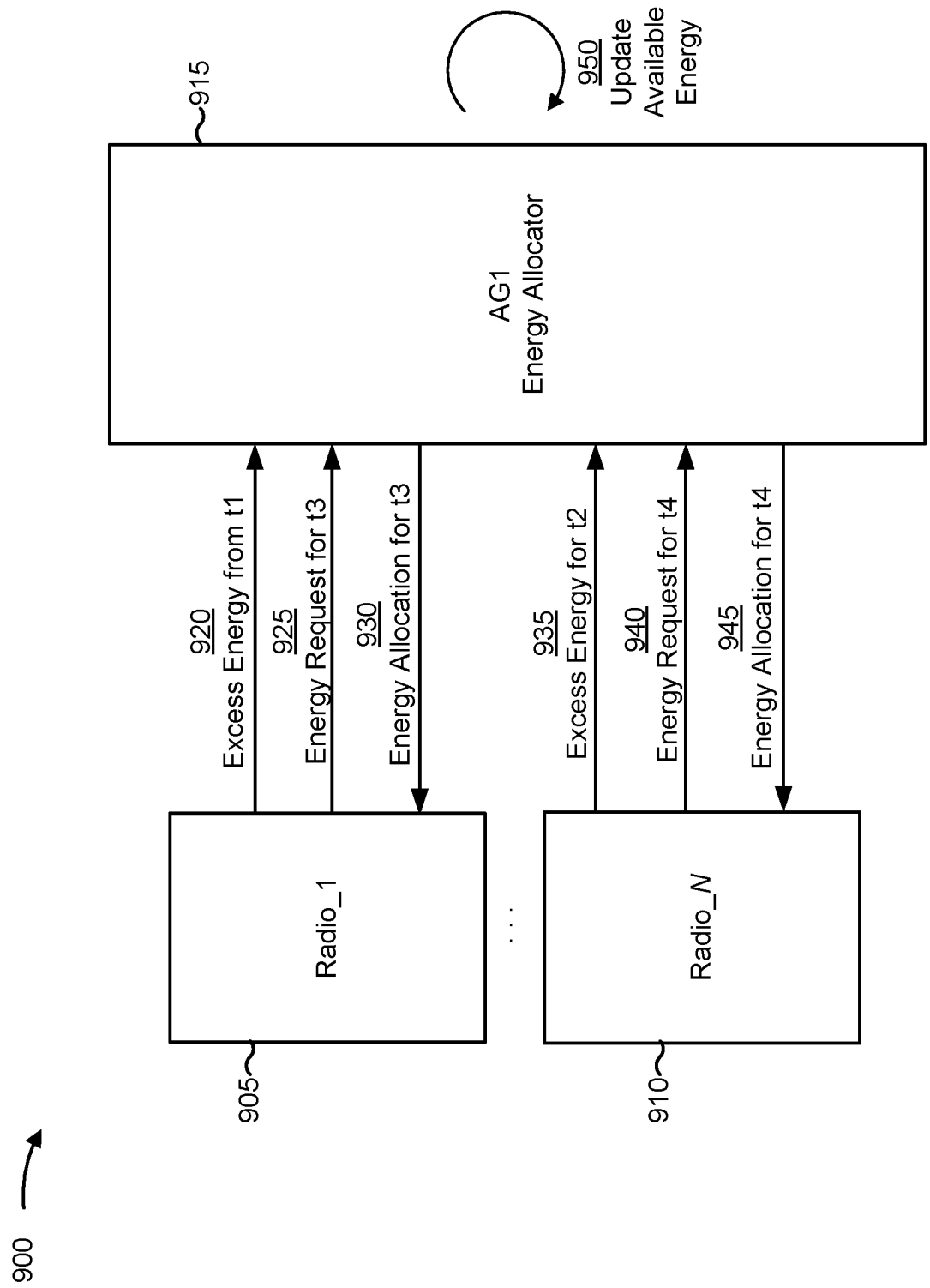
FIG. 9 is a diagram illustrating an example associated with allocating power and/or energy from a shared amount of energy, in accordance with the present disclosure.

FIG. 9 is a diagram illustrating an example 900 associated with allocating power and/or energy from a shared amount of energy, in accordance with the present disclosure.

In FIG. 9, a number, N, of radios (including Radio_1, indicated at 905, through Radio_N, indicated at 910) interact with a first antenna group energy allocator 915. In some aspects, energy allocator 915 may be referred to as a joint inner loop component. The first antenna group energy allocator 915 may allocate energy to the various radios and/or communication links from a shared amount of energy, such as the shared amount of energy 860 described in connection with FIG. 8. In some aspects, the energy allocator 915 may allocate energy to the respective radios and/or communication links by determining and/or configuring energy allocations for use by the radios and/or communication links during respective time periods, as will be described more fully below.

The antenna group energy allocator 915 may be a component of the UE 120 configured to perform the energy allocation tasks described herein, and in some aspects may be and/or may form part of any of the components of the UE 120 discussed in connection with FIG. 2 such as the communication manager 140, the transmit processor 264, the transmission MIMO processor 266, the controller/processor 280, and/or any other component of the UE 120. At a high level, the energy allocator 915 may allocate a total amount of transmission energy available for a given transmission timeframe (e.g., a compliance period) to various radios and/or communication links or the like from a common energy pool or shared amount of energy (e.g., shared amount of energy 860) on an as-needed basis such that the transmission energy is flexibly and efficiently allocated as needed by the various radios and/or communication links to perform various transmission tasks during the transmission timeframe.

For example, the energy allocator 915 may allocate a portion of the shared amount of energy 860 to one or more radios (e.g., Radio_1, . . . , Radio_N) for completing one or more tasks, which, in some aspects, may be low priority (e.g., best effort) transmission tasks. More particularly, the energy allocator 915 may configure energy and/or power allocations for one or more radios and/or communication links over one or more time periods such as by determining and/or configuring a first energy allocation for a first communication link of the UE (e.g., the first radio 905 and/or a communication link associated with the first radio 905) in a first time period (e.g., t1), and by determining and/or configuring a second energy allocation for a second communication link of the UE (e.g., the second radio 910 and/or a communication link associated with the second radio 910) in a second time period (e.g., t2), wherein the first energy allocation and the second energy allocation are based at least in part on the shared amount of energy 860 for the first communication link and the second communication link. In some aspects, the time periods (e.g., first time period t1 and/or the second time period t2) are periods of time shorter than the transmission timeframe (e.g., compliance window) for which the total amount of transmission energy is available for use. For example, in some aspects the transmission timeframe may be 800 ms, and one or more of the time periods (e.g., the first time period t1 and/or the second time period t2) may be 10 ms. Moreover, in some aspects, the energy allocator 915 may configure the energy allocations synchronously, in which case the time periods (e.g., t1 and t2) will be the same time period, while in other aspects, the energy allocator 915 may configure the energy allocations asynchronously, in which case the time periods (e.g., t1 and t2) will be different time periods.

In some aspects, one or more of the radios and/or communication links may not consume all the energy allocated to the corresponding radio and/or communication link for the corresponding time period, and thus the one or more radios and/or communication links may provide an indication to the energy allocator 915 that a portion of the budgeted energy went unused and thus may be available for adding to the shared amount of energy 860. For example, and as indicated by reference number 920, the first radio 905 (e.g., Radio_1) may provide an indication to the energy allocator 915 that certain energy previously allocated to the radio 905 during a first time period (e.g., t1) went unused. This unused energy may be energy that was previously allocated to the radio 905 to perform high priority and/or low priority (e.g., best effort) tasks, but which the radio 905 did not ultimately need and/or did not otherwise use to complete the scheduled transmission tasks for the relevant time period (e.g., first time period t1). Similarly, other radios may also provide indications to the energy allocator 915 of any unused energy allocated to the radio during certain time periods. For example, as indicated by reference number 935, the second radio 910 (e.g., Radio_N) may provide an indication to the energy allocator 915 that certain energy allocated to the radio 910 during a previous time period (e.g., second time period t2) went unused.

The radios and/or communication links may also request additional energy allocation for upcoming time periods to perform additional transmission tasks. For example, the first radio 905 may provide a request for an additional transmission energy allocation for another time period (e.g., a third time period, t3) occurring after the first time period (e.g., t1). The request for additional energy 925 may be based at least in part on one or more factors, such as an anticipated worst case energy consumption over the time period, a past transmission energy usage of the radio, available bandwidth for the radio and/or a quality or efficiency of a communication link, or the like, which will be described more fully below. To the extent enough energy is remaining in the shared amount of energy 860 in order to fulfill the request, the energy allocator 915 may configure a third energy allocation for the first radio 905 and/or communication link in a third time period (e.g., t3), as indicated at reference number 930. The third energy allocation may be an adjustment of the first energy allocation. In some aspects, the third energy allocation may be an adjustment of the first energy allocation in that the configuration provides an indication to increase or decrease the first energy allocation. Additionally, or alternatively, the third energy allocation may be an adjustment of the first energy allocation in that the configuration provides a standalone energy allocation for the forthcoming time period pertaining to the same radio and/or communication link as the first energy power allocation and therefore is an adjustment of the first energy allocation. Thus, the third energy allocation may include a differing amount of transmission energy relative to the first energy allocation reflective of changing link conditions, RF conditions, data to be sent, available energy, or the like.

Similarly, other radios may make additional energy requests and receive additional energy allocations, such as the second radio 910 (e.g., Radio_N) providing a request for an energy allocation for a fourth time period (e.g., t4) occurring after the second time period (e.g., t2) as indicated at reference number 940, such that the energy allocator 915 configures a fourth energy allocation for the second radio 910 and/or communication link in a fourth time period (e.g., t4). The fourth energy allocation may be an adjustment of the second energy allocation. As described above, in some aspects the fourth energy allocation may be an adjustment of the second energy allocation in that the configuration provides an indication to increase or decrease the second energy allocation. Additionally, or alternatively, the fourth energy allocation may be an adjustment of the second energy allocation in that the configuration provides a standalone energy allocation for the forthcoming time period pertaining to the same radio and/or communication link as the second energy power allocation and therefore is an adjustment of the second energy allocation.

Moreover, the third energy allocation and the fourth energy allocation are based at least in part on the shared amount of energy 860 and, more particularly, in some instances may be based at least in part on an amount of energy remaining of the shared amount of energy 860. The fourth time period (e.g., t4) may be a time period different than the third time period (e.g., t3) for asynchronous operation, or the fourth time period may be the same time period as the third time period for synchronous operation. Once the various communication links and/or radios of UE (e.g., the first radio 905 and the second radio 910, or others) are configured with their corresponding energy allocations, the UE may transmit information or other communications in accordance with the allocations. For example, the UE may transmit using at least one of the first radio 905 and/or the first communication link in accordance with the third energy allocation or the second radio 910 and/or the second communication link in accordance with the fourth energy allocation.

As the energy allocator 915 receives indications of unused energy from the various radios and allocates portions of the shared amount of energy 860 for use by the various radios, the energy allocator 915 may update an amount of energy available the shared amount of energy 860, as indicated at reference number 950. For example, at a beginning of a transmission timeframe (e.g., the compliance window), the shared amount of energy 860 may include a cumulative amount of energy available for the various radios' low priority (or best effort) tasks, as was described above in connection with FIG. 8. As each radio thereafter provides indications of unused energy from prior energy allocations and/or requests energy allocations for future transmissions, the energy allocator 915 may add or subtract, respectively, to an amount of energy remaining in the shared amount of energy 860 for the remainder of the transmission timeframe (e.g., compliance window).

Returning to the example 900 depicted in FIG. 9, when the first radio 905 or the second radio 910 indicates to the energy allocator 915 that excess energy from time periods t1 and t2, respectively, were not used, as indicated by reference numbers 920 and 935, respectively, the energy allocator 915 may add the excess energy to the amount of available energy in the shared amount of energy 860. And when the energy allocator 915 allocates additional energy to the first radio 905 and the second radio 910 to be used for transmissions in time periods t3 and t4, respectively, the energy allocator 915 will subtract the allocated energy from the amount of available energy in the shared amount of energy 860. In this way, the UE 120 can efficiently and dynamically distribute an amount of total transmission energy available for performing low priority, or best effort, tasks in accordance with any applicable RF exposure limits for a given transmission timeline (e.g., compliance window) among the various radios and/or communication links.

As was described in connection with FIG. 8, in some aspects, each radio and/or communication link may be provided an energy allocation to be used to perform high priority tasks, and which are not provided from the shared amount of energy 860. Thus, in some aspects, one or more of the radios and/or communication links may receive an additional energy allocation (e.g., an energy allocation in addition to the first energy allocation, the second energy allocation, the third energy allocation, and/or the fourth energy allocation) to perform such high priority tasks. For example, in some aspects the energy allocator 915 may configure a fifth energy allocation for the first radio 905 and/or communication link in a time period (e.g., the first time period (t1) or the third time period (t3)), and/or may configure a sixth energy allocation for the second radio 910 and/or communication link in a time period (e.g., the second time period (t2) or the fourth time period (t4)), wherein the fifth energy allocation and/or the sixth energy allocation are not based on the shared amount of energy 860. In such aspects, the first energy allocation, the second energy allocation, the third energy allocation, and/or the fourth energy allocation may correspond to a first transmission priority (e.g., may correspond to low priority traffic), and the fifth energy allocation and/or the sixth energy allocation may correspond to a second transmission priority higher than the first transmission priority (e.g., the second transmission priority may correspond to high priority traffic). According to some aspects, any portion of energy from any of the energy allocations, whether initially allocated for low priority traffic or high priority traffic, may be added to the shared amount of energy 860 if the portion goes unused by the corresponding radio and/or communication link during the relevant time period.

In some aspects, a radio may request an amount of energy from the shared amount of energy 860 for an upcoming time period based at least in part on an anticipated energy usage over the time interval. For example, the first radio 905 may request an amount of energy for t3, indicated by reference number 925, based at least in part on an anticipated energy usage by the first radio 905 during t3, and the second radio 910 may request an amount of energy for t4, indicated by reference number 940, based at least in part on an anticipated energy usage by the second radio 910 during t4. In some aspects, the anticipated energy usage may be determined according to a past energy usage of the respective radio. For example, the respective radio may request, for a given time period, an amount of energy associated with the radio's average energy usage over the previous time periods of the same duration. In some aspects, a radio may request an amount of energy from the shared amount of energy 860 for a time period based at least in part on a worst case energy consumption over the corresponding time period. The worst case energy consumption may, in some aspects, be determined by using one or more parameters (e.g., a maximum transmit power level (MTPL) value, or an uplink duty cycle value, or the like) to calculate a maximum permissible energy usage for the upcoming transmission. For example, the maximum permissible energy usage may represent an energy usage if the UE transmits at the MTPL for the entirety of a time period, or for all parts of the time period indicated for uplink transmission by the uplink duty cycle value. The radio may then request an amount of energy based at least in part on the worst case energy consumption determined using the various parameters (e.g., the maximum permissible energy consumption provided by the one or more MTPL, upload duty cycle, or similar parameter). Similarly, in some aspects, the amount of energy allocated to each radio by the energy allocator 915 may be based at least in part on a comparison of the amount of energy requested to an amount of energy each respective radio has consumed in one or more past time periods. For example, if, at reference number 925, the first radio 905 requests an amount of energy that is greater than an average amount of energy consumed by the radio 905 for a given time period, the energy allocator 915 may allocate less than the requested amount of energy. If, at reference number 925, the first radio 905 requests an amount of energy that is less than an average amount of energy consumed by the radio 905 for a given time period, the energy allocator 915 may allocate more than the requested amount of energy In some aspects, a radio may request an amount of energy from the shared amount of energy 860 for a time period based at least in part on one or more conditions of a communication link associated with the respective radio. For example, the request may be based at least in part on how much bandwidth is available on the communication link, a quality and/or efficiency of the link (as measured by an energy per byte metric, an RSRP metric, a signal to noise ratio (SNR) metric, a path loss (PL) metric), or the like. Thus, for high quality communication links and/or those having large amounts of bandwidth readily available for transmission, the radio may request more energy for the upcoming time period than for low quality communication links and/or congested links in which not much bandwidth is available. Relatedly, in some aspects, an amount of energy allocated to each radio by the energy allocator 915 may be based at least in part on one or more conditions of a communication link associated with the respective radio. For example, the energy allocator 915 may allocate more energy to radios and/or communication links having a greater bandwidth and/or a high quality link as measured by an energy per byte metric or the like. Or the energy allocator 915 may allocate less energy than requested to radios operating on communication links having low bandwidth or poor quality.

In some aspects, the amount of energy allocated to each radio for upcoming time periods (e.g., the energy allocated to the first radio 905, indicated by reference number 930, and/or the energy allocated to the second radio 910, indicated by reference number 945) may differ from the amount of energy requested by each radio. For example, in some aspects, the amount of energy allocated to each radio may be based at least in part on a comparison of the amount of energy requested to an amount of energy left in the shared amount of energy 860. If the energy request exceeds the amount of energy available in shared amount of energy 860, the energy allocator 915 may allocate less energy to the respective radio in order to maintain transmissions by the antenna group 805 under applicable RF exposure limits. For example, if the request is larger than the amount of energy left in the shared amount of energy 860, the energy allocator 915 may allocate a lesser amount of energy to the radio or the energy allocator 915 may, in some aspects, allocate no additional energy to the radio.

In some aspects, an amount of energy allocated to each radio may be based at least in part on a configuration of the respective radio. For example, more or less energy may be allocated to radios operating on an MCG communication link of a UE operating in a DC mode than to radios operating on a SCG communication link of the DC mode, and/or more or less energy may be allocated to radios communicating using a split bearer than to radios that are not utilizing a split bearer. A split bearer is a bearer on which traffic can be routed via either a master base station or a secondary base station of a dual connectivity configuration. Additionally, or alternatively, more or less energy may be allocated to radios operating on a primary component carrier (PCC) than to radios operating on a secondary component carrier (SCC). Radios operating on a PCC in carrier aggregation (CA) implementations and radios operating on the MCG communication link in DC implementations may be the anchor radios that carry higher priority tasks such as a control channel, VoIP applications, and the like. Thus, for embodiments in which the UE is operating in a CA or a DC mode, more energy may be allocated to the radios operating on the PCC and MCG communication link, respectively to maintain QoS and prevent link failure. Additionally, in split-bearer scenarios, either the MCG communication link or the SCG communication link may be configured as a default data link, which means that if UE buffer size is below a certain threshold the best effort data traffic is scheduled only on this default link. In such implementations, more energy may be allocated to the configured default link (e.g., MCG or SCG). Allocating energy in this way may lead to more efficient use of resources by prioritizing high-priority traffic tasks such as control tasks or like and may lead to reduced link failure and service disruption.

In some aspects, a radio (e.g., the first radio 905 and/or a second radio 910) may determine a maximum transmission power for a time period based at least in part on high priority energy allocated to the radio and/or energy allocated to the radio from the shared amount of energy 860 for use for low priority (e.g., best effort) tasks. For example, for a given time period (e.g., t1) the first radio 905 may be allocated a first energy allocation for performing low priority tasks and a fifth energy allocation for performing high priority tasks, as described. The first radio 905 may thus calculate a maximum transmission power for the time period (t1) based at least in part on the first energy allocation and the fifth energy allocation and perform the radio's various transmission tasks accordingly.

According to some aspects, a UE may provide a base station or the like an indication of an amount of energy left in the shared amount of energy 860. For example, the UE provide the base station a buffer status report (BSR) indication based at least in part on an amount of energy in the shared amount of energy 860. At a high level, a BSR indication is an indication provided by a UE to a base station or the like that provides information about an amount of data available for transmission in the UE's uplink buffers so that the base station may grant the UE resources to transmit the data. In some aspects, a BSR indication is provided based at least in part on the amount of energy in the shared amount of energy 860 by determining how much data could be transmitted using the shared amount of energy 860, and reporting that amount of data in the BSR indication. In this regard, determining the BSR indication from the shared amount of energy 860 may provide a more accurate representation of how much data may ultimately be transferred during an upcoming time period and may avoid a situation in which a base station grants a UE resources to transmit all data within the UE's upload buffers yet the UE is unable to utilize all the resources without exceeding the applicable RF exposure limits. In some aspects, when the shared amount of energy 860 falls below a certain threshold, the UE may provide the base station or the like a BSR indication of zero (e.g., an indication that there is no data to be transferred) so that the base station stops scheduling data communications for the given transmission timeframe.

In some aspects, an amount of energy allocated to the various radios by the energy allocator 915 may be spread over time (e.g., over the transmission timeframe and/or compliance window) in order to maintain a certain peak transmission power to average transmission power ratio (sometimes abbreviated as PAPR) for that timeframe. Accordingly, when allocating the energy to one of the radios, such as to radio 905 at reference number 930 or to radio 910 at reference number 945, the energy allocator 915 may allocate less energy than was requested at reference number 925 and 940, respectively, to avoid a spike and/or high peak in energy usage and instead maintain energy usage for the forthcoming time period nearer to an average energy usage.

Similarly, in some aspects one or more radios may release energy to the shared amount of energy 860 in order to maintain a certain peak transmission power to average transmission power ratio. For example, based at least in part on the peak transmission power to average transmission power ratio increasing to satisfy a threshold, one or more of the radios may release a portion of the low priority, or best effort, energy allocated to them to the shared amount of energy 860 and thus suspend certain low priority tasks until later in the transmission timeframe, thereby lowering the current transmission power while keeping the associated energy available for use later in the transmission timeframe. In some aspects, the peak transmission power to average transmission power ratio may use a normalized average power (e.g., "average power/$P_{lim}$").

In some aspects, the varying radios may be subject to various RF exposure compliance limits (e.g., SAR exposure limits and/or MPE (e.g., PD) limits) and thus may be subject to differing compliance windows when determining the applicable exposure limit contribution. Accordingly, in some aspects an amount of energy added to or allocated from the shared amount of energy 860 may be scaled according to a corresponding compliance window size. Moreover, in some aspects radios that have entered a sleep mode or the like (e.g., a connect discontinuous reception (CDRX) mode or similar) may not interact with the shared amount of energy 860 at all. Thus, the radio in sleep mode or the like may not provide indications of any excess energy to the energy allocator 915 and/or may not request any additional low priority energy from the shared amount of energy 860 while remaining in the sleep mode.

Again, FIGS. 8 and 9 illustrate examples corresponding to one antenna group (AG1). In some aspects, a UE may include multiple antenna groups, and thus the aspects described herein would apply to each antenna group, of the multiple antenna groups. More particularly, because each antenna group may separately be considered with respect to the applicable RF exposure limits, each antenna group may be associated with a respective shared amount of energy (similar to the shared amount of energy 860) from which energy may be allocated to each radio within the antenna group in order perform low priority, best effort transmission tasks.

Moreover, in some aspects, any radio belonging to more than one antenna group may make a duplicative energy request to each energy allocator of each antenna group. For example, if the first radio 905 were also included in a second antenna group, the energy request for t3 provided to the energy allocator 915, as indicated by reference number 925, would also be provided to an energy allocator associated with the second antenna group to ensure both antenna groups remain below the applicable RF exposure compliance limits. Put another way, utilizing an energy allocation or budget from one antenna group without considering whether that allocation or budget is permitted by the other antenna group may be problematic because the radio's use of the first antenna group's allocation could put the second antenna group over an RF exposure compliance limit. Thus, if the energy allotted from each energy allocator is not equal (e.g., if the energy allocation 930 from the first energy allocator 915 is more or less than an energy allocation provided to the first radio 905 from a second energy allocator), then the radio may transmit using the lesser of the allocated energies to ensure that all antenna groups to which the radio belongs remain under the applicable RF exposure compliance limits. Similarly, when a BSR indication is provided to a base station or the like for a certain radio based at least in part on the shared amount of energy, the BSR indication may be provided based at least in part on a minimum of all the shared amounts of energy for the antenna groups to which the radio belongs.

As indicated above, FIG. 9 is provided as an example. Other examples may differ from what is described with regard to FIG. 9.

Figure 10:
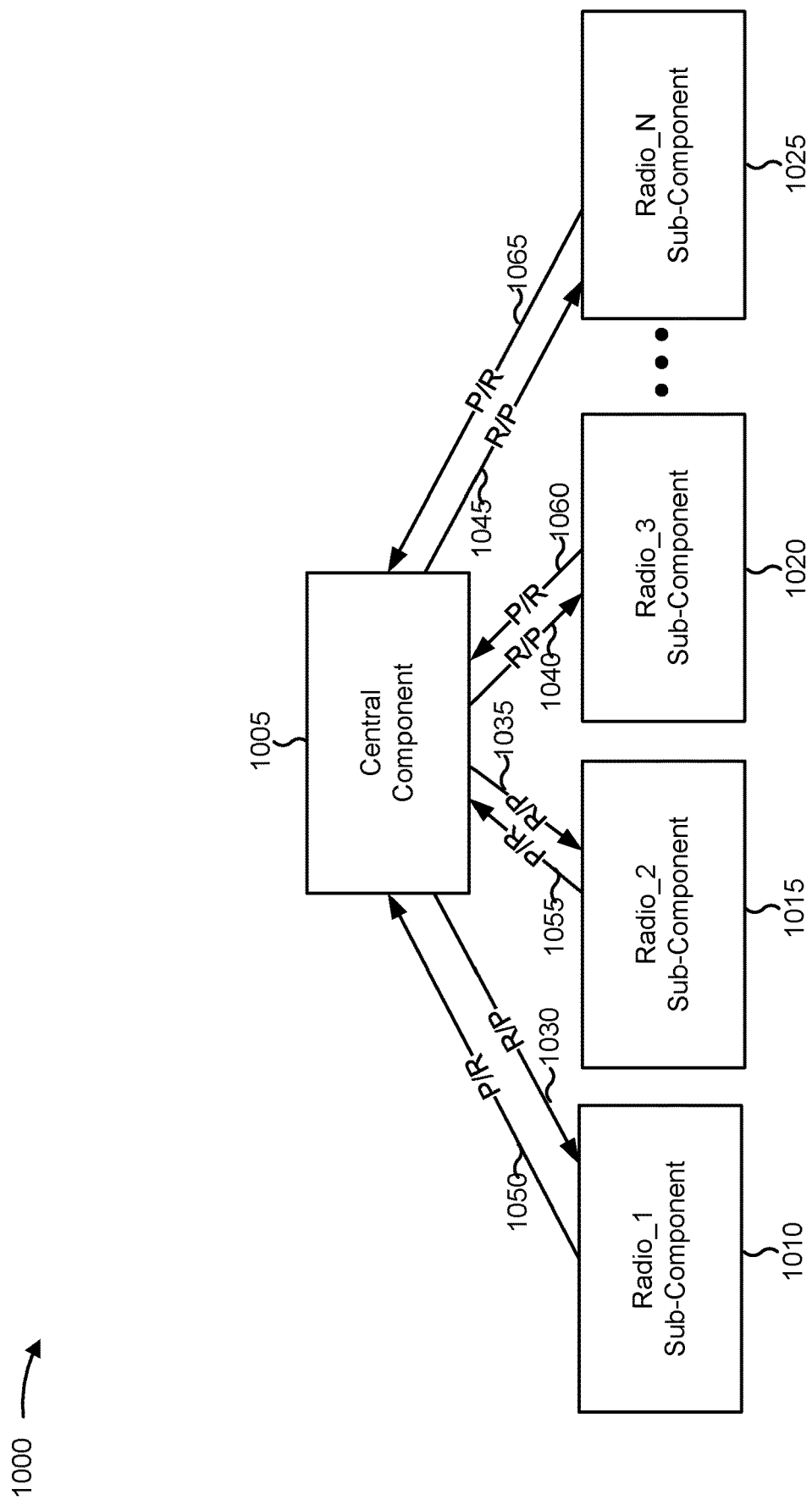
FIG. 10 is a diagram illustrating an example associated with allocating power and/or energy from a central component, in accordance with the present disclosure.

FIG. 10 is a diagram illustrating an example 1000 associated with allocating power and/or energy from a central component, in accordance with the present disclosure.

According to some aspects, one or more of the energy and/or power allocation techniques described herein may be performed by multiple components and/or algorithms. For example, in some aspects a central component, such as a central component 1005, may assign power levels and/or provide energy allocations among the various radios (e.g., communication links). In some aspects, the central component 1005 may perform a central algorithm. Different components or algorithms (e.g., sub-components), as indicated at reference numbers 1010, 1015, 1020, and 1025, may configure the allocated power and/or energy for use for various communication tasks, such as high priority and low priority tasks, as described above in connection with FIG. 8. For example, the different sub-components 1010, 1015, 1020, and 1025 may perform sub-algorithms. In the depicted example, the central component 1005 may assign power limits and/or configure energy allocations among N radios (e.g., Radio_1 through Radio_N). In some aspects, the central component 1005 may assign power limits and/or configure energy allocations among the various radios once per every transmission timeframe. In some aspects, the central component 1005 may be associated with the energy allocator 915, such as by forming part of the energy allocator 915 and/or being the same component as the energy allocator 915. Each radio (e.g., in the depicted aspects, Radio_1 through Radio_N) may allocate energy and/or assign power limits to perform certain transmission tasks for time periods shorter than the transmission timeframe, as described above in connection with FIG. 9.

In some aspects, the central component 1005 may allocate energy and/or provide power limits to one or more radios based at least in part on a normalized exposure ratio. As described above, in some implementations the normalized exposure ratio may be a normalized SAR exposure and/or PD contribution of each radio (e.g., the SAR exposures and/or PD contribution of the radio, represented as $SAR_i$ and/or $PD_i$, divided by the applicable SAR exposure and/or PD limit, represented as $SAR_{lim}$ and/or $PD_{lim}$). In some aspects, the central component 1005 may determine a budgeted exposure limit for one or more radios (e.g., $SAR_i/SAR_{lim}$ and/or $PD_i/PD_{lim}$). The central component 1005 may configure an energy allocation and/or power limit for a corresponding radio based at least in part on the normalized exposure ratio. More particularly, the central component 1005 may provide a ratio-to-power (R/P) conversion for each configured radio (e.g., R/P conversion 1030, R/P conversion 1035, R/P conversion 1040, and R/P conversion 1045). In some aspects, the R/P conversion may be configured by multiplying a transmission power limit for the transmission timeline by the radio's normalized exposure ratio. Put another way, to determine a power limit associated with a certain sub-component (which in some aspects may be referred to as sub.algo.Tx_power_limit_mW) for one or more of the radios, the transmission power limit for the UE 120 (which in some aspects may be referred to as radio_Plimit_mW) is multiplied by the normalized exposure limit for the respective radio (which in some aspects may be referred to as central.algo.norm_exposure_ratio).

Similarly, in some aspects each sub-component 1010, 1015, 1020, and 1025 may convert a transmitted power report to a normalized value for processing by the central component 1005. More particularly, when reporting power usage to the central component 1005, one or more of the sub-components 1010, 1015, 1020, and 1025 may provide a power-to-ratio (P/R) conversion for the respective power usage (e.g., P/R conversion 1050, P/R conversion 1055, P/R conversion 1060, and P/R conversion 1065). In some aspects, one or more sub-component may configure and/or determine a normalized exposure report (which in some aspects may be referred to as central.algo.norm_exposure_report) by dividing a transmitted power for the corresponding radio (which in some aspects may be referred to as sub.algo.transmitted_power_report_mW) by the transmission power limit for the UE 120 (which in some aspects may be referred to as radio_Plimit_mW). In this way, by the central component 1005 configuring transmission power limits in accordance with a normalized exposure limit and by the central component 1005 receiving normalized transmission power reports from the respective sub-components 1010, 1015, 1020, and 1025, the central component 1005 may ensure time-averaged RF exposure compliance from all radios and/or communication links.

In some aspects, the R/P conversions 1030, 1035, 1040, and 1045 and/or the P/R conversions 1050, 1055, 1060, and 1065 may be scaled according to a respective conversion factor. As discussed above in connection with FIG. 9, the various radios may operate in various time periods and/or compliance windows. Thus, the timeframes in which the central component 1005 and one or more of the sub-components 1010, 1015, 1020, and 1025 are performing energy allocation and/or power distribution tasks may not be equal. In this regard, one or more of the configurations and/or metrics described herein may be scaled or otherwise converted using a conversion factor, which may be determined by dividing a length of a time period in which the sub-components 1010, 1015, 1020, and 1025 operates by a length of a time period in which the central component 1005 operates (e.g., the transmission timeframe). By way of example, in some aspects the central component 1005 may provide energy and/or power allocations to the various radios in a 100 s transmission timeframe. However, the first sub-component 1010 may operate in a 90 s time period, the second sub-component 1015 may operate in a 30 s time period, the third sub-component 1020 may operate in a 80 s time period, and the fourth sub-component 1025 may operate in a 100 s time period. In this example, the respective conversion factors would be 0.6 for the first sub-component 1010 (e.g., 90 s/100 s), 0.3 for the second sub-component 1015 (e.g., 30 s/100 s), 0.5 for the third sub-component 1020 (e.g., 80 s/100 s), and 1.0 for the fourth sub-component 1025 (e.g., 100 s/100 s). The R/P conversions and P/R conversions may thus be multiplied and divided, respectively, by the corresponding conversion factor to ensure appropriately scaled power limits and associated reports. More particularly, the R/P conversion may be configured as follows: sub.algo.Tx_power_limit_mW=radio_Plimit_mW* central.algo.norm_exposure_ratio*CF, where CF corresponds to the associated conversion factor. And the P/R conversion may be configured as follows: centraialgo.norm_exposure_report=sub.algo.transmitted_power_report_mW/radio_Plimit_mW/CF.

As described elsewhere, in some aspects the various radios (e.g., communication links) may share energy and/or power or otherwise reallocate energy and/or power among themselves. Accordingly, in some implementations, a conversion factor may be implemented to scale or otherwise convert energy allocations and/or power limits when being shared among the various sub-components 1010, 1015, 1020, and 1025 operating at respective radios. Namely, in some aspects, energy and/or power reallocated among the various sub-components 1010, 1015, 1020, and 1025 may be multiplied by a conversion factor to result in the radio-specific energy and/or power budget. In such aspects, the conversion factor may be equal to the length of the operating time period of the sub-components 1010, 1015, 1020, and 1025 that receives the reallocated energy, divided by the length of the time period of the sub-components 1010, 1015, 1020, and 1025 from which the reallocated energy is transferred. Returning to the above example, energy reallocated from the first sub-component 1010 to the second sub-component 1015 may be multiplied by a conversion factor of 0.5 (e.g., 30 s time period/90 s time period).

In some aspects, one or more radios may be capable of operating in different frequency bands or otherwise operating under varying conditions. In such aspects, the radio may include multiple applicable conversion factors, one for each frequency band or other operating condition, and in such aspects the central component 1005 and/or the applicable sub-components 1010, 1015, 1020, and 1025 may select one conversion factor from multiple conversion factors.

As indicated above, FIG. 10 is provided as an example. Other examples may differ from what is described with regard to FIG. 10.

Figure 11:
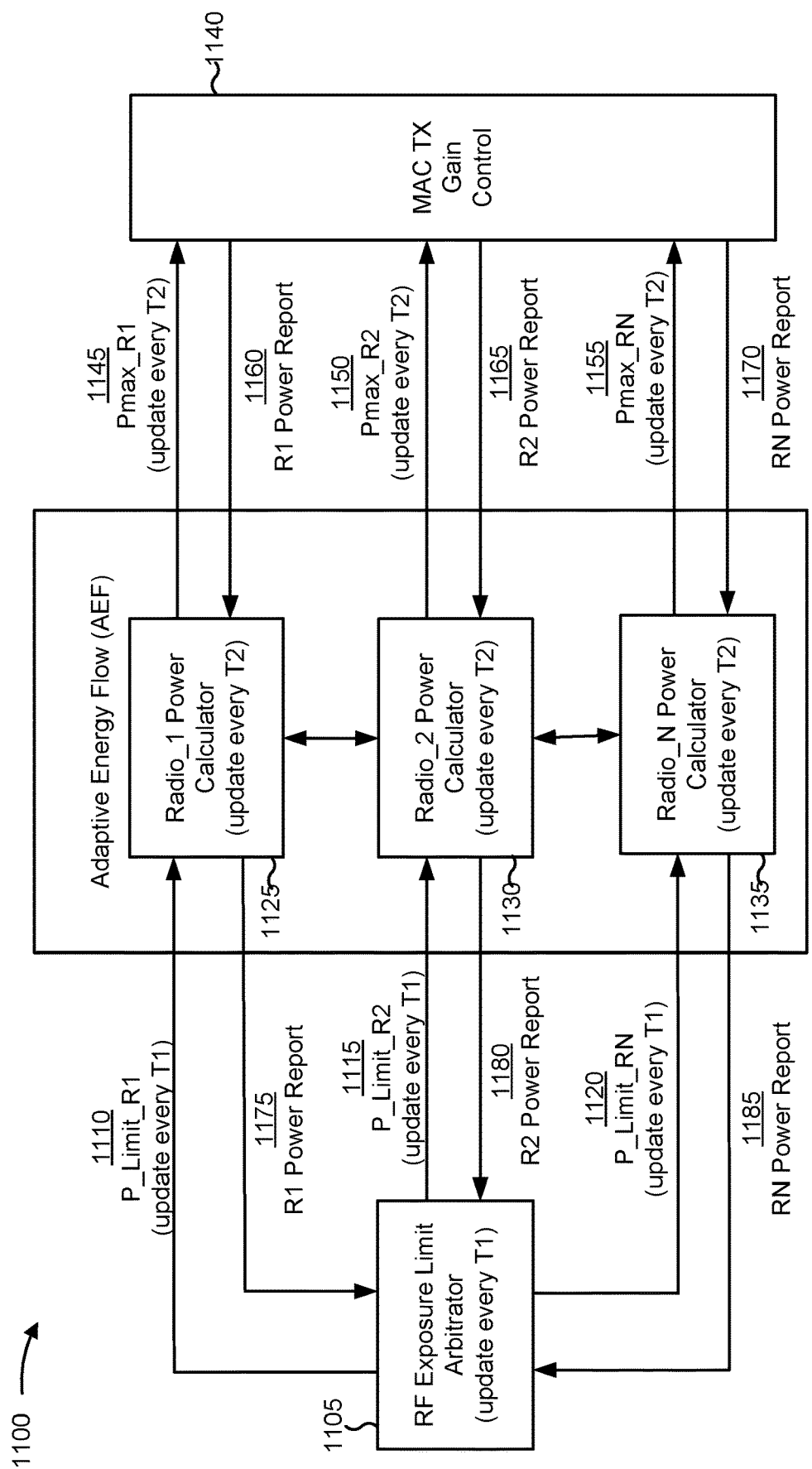
FIG. 11 is a diagram illustrating an example associated with allocating power and/or energy among various radios, in accordance with the present disclosure

FIG. 11 is a diagram illustrating an example 1100 associated with allocating power and/or energy among various radios, in accordance with the present disclosure.

In FIG. 11, energy and/or power budgets may be shared among the various radios and/or communication links using an adaptive energy flow. The adaptive energy flow may reallocate energy and/or power budgets to reflect usage of each radio (e.g., communication link) within the transmission timeframe.

More particularly, an RF exposure arbitrator 1105 may initially allocate energy and/or power limits among various radios to maintain RF exposure limits from a UE below one or more compliance limits. In this regard, the RF exposure arbitrator 1105 may be the same component or form part of the same component as various other power distribution components described herein, such as the energy allocator 915, the central component 1005, and/or another component.

The RF exposure arbitrator 1105 may allocate the applicable energy and/or power limits once every T1 time period, which, in this aspect, may be equal to the transmission timeline. Thus, in some aspects the T1 time period of FIG. 11 may be a different time period than the t1 time period of FIG. 9. The energy limits, indicated by reference numbers 1110, 1115, and 1120, represent budgeted portions of energy usage for each radio that, if collectively consumed, would still maintain the UE under the applicable RF exposure compliance limits. For example, in some aspects the UE 120 may include a first radio configured to communicate on a 4G LTE frequency band, a second radio configured to communicate on a sub-6 GHz 5G New Radio frequency band (e.g., FR1), a third radio configured to communicate on a mmWave 5G New Radio frequency band (e.g., FR2), and/or other radios. Accordingly, the RF exposure arbitrator 1105 may assign a maximum average transmit power and/or power density limits to each radio and/or frequency band for every T1 seconds, which comply with the applicable RF exposure limits (e.g., SAR and/or MPE).

Each radio may calculate an instantaneous power limit for a time period less than the transmission timeframe based at least in part on a power limit assigned to the radio by the RF exposure arbitrator 1105 using a power calculator, indicated by reference numbers 1125, 1130, and 1135. More particularly, the instantaneous power limits are power limits that the power calculators 1125, 1130, and 1135 determine are available to perform transmission tasks by the respective radios and/or communication links for a time period T2 that is shorter than the transmission timeline T1 while remaining under the applicable RF exposure compliance limits for the T1.

Each power calculator 1125, 1130, and 1135 may provide the instantaneous transmit power limits to a transmission gain controller or the like, such as a MAC transmission gain control 1140, as generally indicated by reference numbers 1145, 1150, and 1155. The MAC transmission gain control 1140 may determine a requested uplink transmit power of data or other communication to be transmitted by each radio for the time period T2. For example, the MAC transmission gain control 1140 may determine how much power is required to transmit an amount of data in the respective radio's buffers for the time period T2. The MAC transmission gain control 1140 may compare the determined requested uplink transmit power for each radio with that radio's instantaneous transmit power as determined by the respective power calculator 1125, 1130, and 1135. The MAC transmission gain control 1140 may assign a transmission power for the respective time period according to the lesser of the requested uplink transmit power and the instantaneous transmit power. As indicated by reference numbers 1160, 1165, and 1170, the MAC transmission gain control 1140 may provide, to the respective power calculators 1125, 1130, and 1135, a report indicating the power actually used for each radio during the time period, T2. That is, the respective power reports 1160, 1165, and 1170 may report the lesser of the instantaneous transmit power and the requested transmit power for each radio during the applicable time period T2.

Thus, the power reports 1160, 1165, and 1170 may indicate that each respective radio used less than the instantaneous transmit power 1145, 1150, and 1155, respectively, because the associated power requirement was less than the budgeted instantaneous transmit power 1145, 1150, and 1155, or the power reports 1160, 1165, and 1170 may indicate that each respective radio was not able to complete all requested transmission tasks for the associated time period because the instantaneous transmit power 1145, 1150, and 1155, respectively, was less than the requested transmit power. In some aspects, the adaptive energy flow may thus dynamically allocate and/or redistribute the total available power based on the actual traffic from each radio within the transmission timeframe T1. In this way, the total available power for all radios may be fully utilized when traffic is heavy for one radio (e.g., communication link) but not for others.

More particularly, if the power report 1160 provided to the first radio calculator 1125 indicated that the first radio used less than the instantaneous power transmit limit 1145 during T2, and if the power report 1165 provided to the second radio calculator 1130 indicated that the second radio used all of the instantaneous power transmit limit 1150 during T2, the adaptive energy flow may configure or otherwise allocate a portion of the first radio energy and/or power budget for use by the second radio during subsequent time periods T2. The power calculators 1125, 1130, and 1135 may thereafter provide a respective power report to the RF exposure arbitrator 1105, indicated by reference numbers 1175, 1180, and 1185, respectively, detailing the actual energy and/or power usage by each radio during the transmission timeframe (e.g., the usage of any budgeted energy and/or power plus the use of any borrowed energy or power from other radios). The RF exposure arbitrator 1105 may thus adjust energy and/or power configurations for future transmission timeframes based at least in part on the feedback received in the respective power reports 1175, 1180, and 1185. In this way, energy and/or power budgets may be dynamically shared and updated within the transmission timeframe while remaining under the applicable RF exposure limits.

As indicated above, FIG. 11 is provided as an example. Other examples may differ from what is described with regard to FIG. 11.

Figure 12:
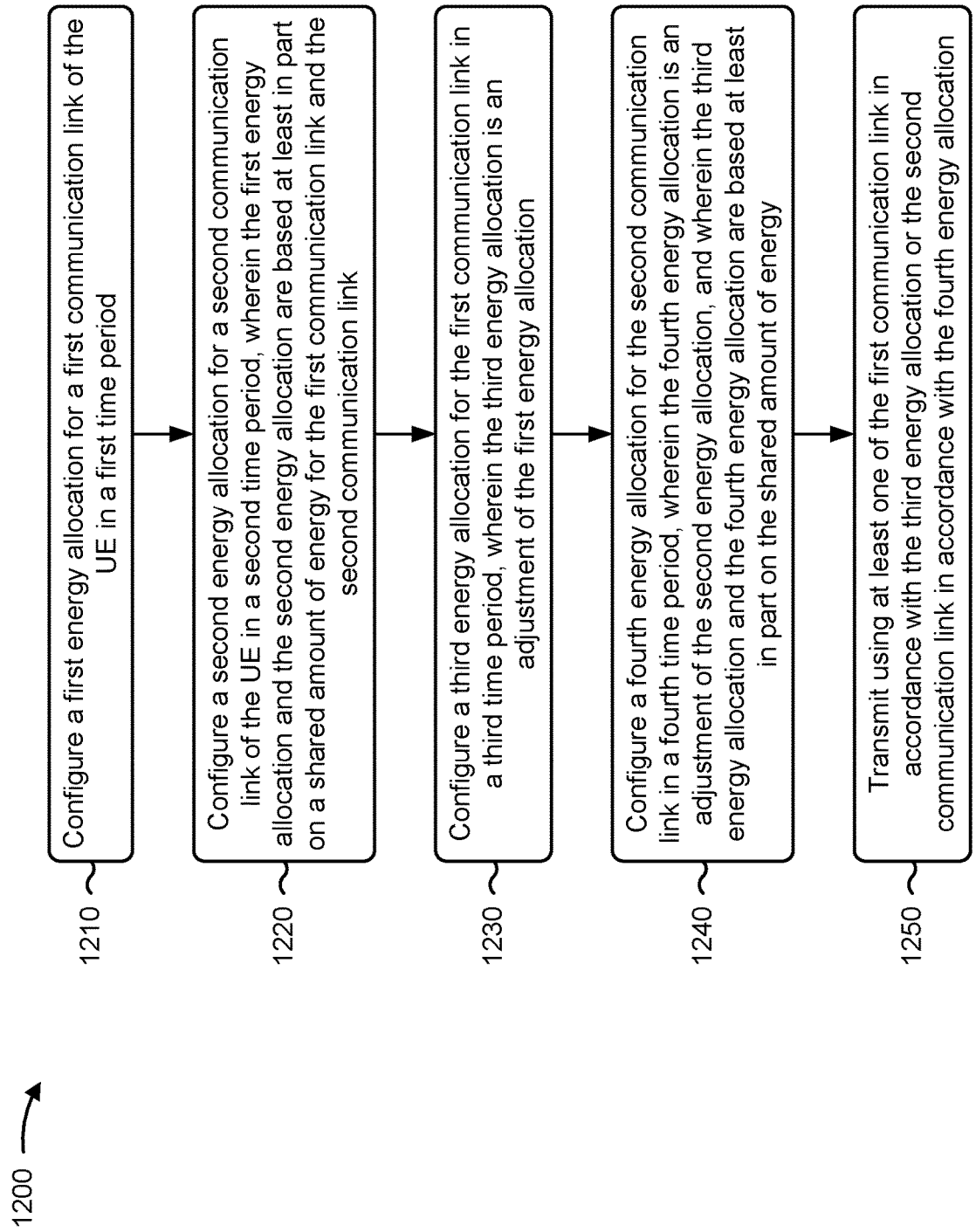
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with dynamic energy allocation across multiple radios.

As shown in FIG. 12, in some aspects, process 1200 may include configuring a first energy allocation for a first communication link of the UE in a first time period (block 1210). For example, the UE (e.g., using communication manager 140 and/or configuration component 1308, depicted in FIG. 13) may configure a first energy allocation for a first communication link of the UE in a first time period, as described above.

As further shown in FIG. 12, in some aspects, process 1200 may include configuring a second energy allocation for a second communication link of the UE in a second time period, wherein the first energy allocation and the second energy allocation are based at least in part on a shared amount of energy for the first communication link and the second communication link (block 1220). For example, the UE (e.g., using communication manager 140 and/or configuration component 1308, depicted in FIG. 13) may configure a second energy allocation for a second communication link of the UE in a second time period, wherein the first energy allocation and the second energy allocation are based at least in part on a shared amount of energy for the first communication link and the second communication link, as described above.

As further shown in FIG. 12, in some aspects, process 1200 may include configuring a third energy allocation for the first communication link in a third time period, wherein the third energy allocation is an adjustment of the first energy allocation (block 1230). For example, the UE (e.g., using communication manager 140 and/or configuration component 1308, depicted in FIG. 13) may configure a third energy allocation for the first communication link in a third time period, wherein the third energy allocation is an adjustment of the first energy allocation, as described above.

As further shown in FIG. 12, in some aspects, process 1200 may include configuring a fourth energy allocation for the second communication link in a fourth time period, wherein the fourth energy allocation is an adjustment of the second energy allocation, and wherein the third energy allocation and the fourth energy allocation are based at least in part on the shared amount of energy (block 1240). For example, the UE (e.g., using communication manager 140 and/or configuration component 1308, depicted in FIG. 13) may configure a fourth energy allocation for the second communication link in a fourth time period, wherein the fourth energy allocation is an adjustment of the second energy allocation, and wherein the third energy allocation and the fourth energy allocation are based at least in part on the shared amount of energy, as described above.

As further shown in FIG. 12, in some aspects, process 1200 may include transmitting using at least one of the first communication link in accordance with the third energy allocation or the second communication link in accordance with the fourth energy allocation (block 1250). For example, the UE (e.g., using communication manager 140 and/or transmission component 1304, depicted in FIG. 13) may transmit using at least one of the first communication link in accordance with the third energy allocation or the second communication link in accordance with the fourth energy allocation, as described above.

Process 1200 may include additional aspects, such as any single aspect or any combination of aspects described below and/or in connection with one or more other processes described elsewhere herein.

In a first aspect, the first time period and the second time period are the same time period.

In a second aspect, the first time period and the second time period are different time periods.

In a third aspect, alone or in combination with one or more of the first and second aspects, the third time period and the fourth time period are the same time period.

In a fourth aspect, alone or in combination with one or more of the first and second aspects, the third time period and the fourth time period are different time periods.

In a fifth aspect, alone or in combination with one or more of the first through fourth aspects, process 1200 includes configuring a fifth energy allocation for the first communication link in the first time period, wherein the fifth energy allocation is not based on the shared amount of energy for the first communication link and the second communication link.

In a sixth aspect, alone or in combination with one or more of the first through fifth aspects, the first energy allocation is associated with a first transmission using the first communication link and corresponding to a first transmission priority, and wherein the fifth energy allocation is associated with a second transmission using the first communication link and corresponding to a second transmission priority, wherein the second transmission priority is higher than the first transmission priority.

In a seventh aspect, alone or in combination with one or more of the first through sixth aspects, process 1200 includes adding at least a portion of unused energy from the fifth energy allocation to the shared amount of energy.

In an eighth aspect, alone or in combination with one or more of the first through seventh aspects, process 1200 includes determining a transmission power associated with the first communication link for the first time period based at least in part on the first energy allocation and the fifth energy allocation.

In a ninth aspect, alone or in combination with one or more of the first through eighth aspects, at least one of the third energy allocation or the fourth energy allocation is based at least in part on unused energy from at least one of the first energy allocation or the second energy allocation being available in the shared amount of energy.

In a tenth aspect, alone or in combination with one or more of the first through ninth aspects, process 1200 includes adding at least one of unused energy from the first energy allocation or unused energy from the second energy allocation to the shared amount of energy.

In an eleventh aspect, alone or in combination with one or more of the first through tenth aspects, adding the at least one of unused energy from the first energy allocation or the unused energy from the second energy allocation to the shared amount of energy is based at least in part on at least one compliance window of at least one radiation exposure parameter.

In a twelfth aspect, alone or in combination with one or more of the first through eleventh aspects, at least one of the first energy allocation, the second energy allocation, the third energy allocation, or the fourth energy allocation is based at least in part on an anticipated energy usage during the first time period, the second time period, the third time period, or the fourth time period, respectively.

In a thirteenth aspect, alone or in combination with one or more of the first through twelfth aspects, the anticipated energy usage is associated with a worst case energy usage during the first time period, the second time period, the third time period, or the fourth time period.

In a fourteenth aspect, alone or in combination with one or more of the first through thirteenth aspects, at least one of the third energy allocation or the fourth energy allocation is based at least in part on energy usage by the first communication link in the first time period or energy usage by the second communication link in the second time period, respectively.

In a fifteenth aspect, alone or in combination with one or more of the first through fourteenth aspects, at least one of the first energy allocation, the second energy allocation, the third energy allocation, or the fourth energy allocation is based at least in part on a quality of a radio link associated with at least one of the first communication link or the second communication link.

In a sixteenth aspect, alone or in combination with one or more of the first through fifteenth aspects, at least one of the first energy allocation, the second energy allocation, the third energy allocation, or the fourth energy allocation is based at least in part on a request for an amount of energy associated with at least one of the first communication link or the second communication link and an amount of energy available in the shared amount of energy.

In a seventeenth aspect, alone or in combination with one or more of the first through sixteenth aspects, at least one of the first energy allocation, the second energy allocation, the third energy allocation, or the fourth energy allocation is based at least in part on a configuration of at least one of the first communication link or the second communication link.

In an eighteenth aspect, alone or in combination with one or more of the first through seventeenth aspects, process 1200 includes providing, to a base station, an indication of an amount of energy remaining in the shared amount of energy.

In a nineteenth aspect, alone or in combination with one or more of the first through eighteenth aspects, process 1200 includes providing, to a base station, a BSR communication associated with the first communication link based at least in part on the shared amount of energy.

In a twentieth aspect, alone or in combination with one or more of the first through nineteenth aspects, the BSR communication indicates that the UE has no data to transmit on the first communication link when the shared amount of energy is below a threshold amount of energy.

In a twenty-first aspect, alone or in combination with one or more of the first through twentieth aspects, the UE includes multiple antenna groups, wherein the first communication link is associated with a first antenna group and a second antenna group, of the multiple antenna groups, wherein the first antenna group is associated with the shared amount of energy, wherein the second antenna group is associated with a second shared amount of energy, and wherein the BSR communication is based at least in part on both the shared amount of energy and the second shared amount of energy.

In a twenty-second aspect, alone or in combination with one or more of the first through twenty-first aspects, at least one of the first energy allocation, the second energy allocation, the third energy allocation, or the fourth energy allocation is based at least in part on a comparison of a peak transmission power of the UE to an average transmission power of the UE.

In a twenty-third aspect, alone or in combination with one or more of the first through twenty-second aspects, process 1200 includes adding at least one of a portion of energy associated with the first energy allocation or a portion of energy associated with the second energy allocation to the shared amount of energy based at least in part on a comparison of a peak transmission power of the UE to an average transmission power of the UE.

In a twenty-fourth aspect, alone or in combination with one or more of the first through twenty-third aspects, at least one of the first energy allocation, the second energy allocation, the third energy allocation, or the fourth energy allocation is based at least in part on at least one compliance window of at least one radiation exposure parameter.

In a twenty-fifth aspect, alone or in combination with one or more of the first through twenty-fourth aspects, the process 1200 further comprises, based at least in part on at least one of the first communication link or the second communication link entering a sleep mode during a fifth time period or a sixth time period, respectively, providing no energy allocation associated with the shared amount of energy to the at least one of the first communication link or the second communication link during the fifth time period or the sixth time period, respectively.

In a twenty-sixth aspect, alone or in combination with one or more of the first through twenty-fifth aspects, the UE includes multiple antenna groups, and wherein the shared amount of energy is available for allocation to only communication link associated with a first antenna group of the multiple antenna groups.

In a twenty-seventh aspect, alone or in combination with one or more of the first through twenty-sixth aspects, the first communication link is associated with the first antenna group and a second antenna group, of the multiple antenna groups, wherein a second shared amount of energy is available for allocation to only communication link associated with the second antenna group, and wherein the first energy allocation is based at least in part on both the shared amount of energy and the second shared amount of energy.

In a twenty-eighth aspect, alone or in combination with one or more of the first through twenty-seventh aspects, a first component of the UE configures the first energy allocation, the second energy allocation, the third energy allocation, and the fourth energy allocation, wherein a second component of the UE different from the first component configures a first transmission power for the first communication link based at least in part on at least one of the first energy allocation or the third energy allocation, and wherein a third component of the UE different from the first component and the second component configures a second transmission power for the second communication link based at least in part on at least one of the second energy allocation or the fourth energy allocation.

In a twenty-ninth aspect, alone or in combination with one or more of the first through twenty-eighth aspects, one or more of the first energy allocation, the second energy allocation, the third energy allocation, or the fourth energy allocation is based at least in part on an exposure ratio.

In a thirtieth aspect, alone or in combination with one or more of the first through twenty-ninth aspects, the process 1200 further comprises determining a transmission power for one of the first communication link or the second communication link based at least in part on the exposure ratio.

In a thirty-first aspect, alone or in combination with one or more of the first through thirtieth aspects, the process 1200 further comprises determining the transmission power for the one of the first communication link or the second communication link based at least in part on a conversion factor associated with two different time periods.

In a thirty-second aspect, alone or in combination with one or more of the first through thirty-first aspects, the process 1200 further comprises selecting the conversion factor from multiple conversion factors associated with the one of the first communication link or the second communication link.

In a thirty-third aspect, alone or in combination with one or more of the first through thirty-second aspects, the process 1200 further comprises providing a transmission power report based at least in part on a transmission power for one of the first communication link and the second communication link.

In a thirty-fourth aspect, alone or in combination with one or more of the first through thirty-third aspects, the transmission power report is based at least in part on a transmission power ratio.

In a thirty-fifth aspect, alone or in combination with one or more of the first through thirty-fourth aspects, the transmission power ratio is based at least in part on a comparison of the transmission power for the one of the first communication link and the second communication link and a transmission power limit for the one of the first communication link and the second communication link.

In a thirty-sixth aspect, alone or in combination with one or more of the first through thirty-fifth aspects, the transmission power report is based at least in part on a conversion factor associated with two different time periods.

In a thirty-seventh aspect, alone or in combination with one or more of the first through thirty-sixth aspects, the process 1200 further comprises selecting the conversion factor from multiple conversion factors associated with the one of the first communication link or the second communication link.

In a thirty-eighth aspect, alone or in combination with one or more of the first through thirty-seventh aspects, the process 1200 further comprises configuring a portion of the first energy allocation or the third energy allocation for use by the second communication link.

In a thirty-ninth aspect, alone or in combination with one or more of the first through thirty-eighth aspects, configuring the portion of the first energy allocation or the third energy allocation is based at least in part on a conversion factor associated with two different time periods.

In a fortieth aspect, alone or in combination with one or more of the first through thirty-nine aspects, the process 1200 further comprises configuring a first transmission power limit associated with the first communication link for a fifth time period, wherein the first transmission power limit is associated with a first band; and configuring a second transmission power limit associated with the second communication link for the fifth time period, wherein the second transmission power limit is associated with a second band different than the first band.

In a forty-first aspect, alone or in combination with one or more of the first through fortieth aspects, the fifth time period encompasses the first time period, the second time period, the third time period, and the fourth time period.

In a forty-second aspect, alone or in combination with one or more of the first through forty-first aspects, the process 1200 further comprises configuring a first instantaneous transmission power limit for the first communication link in the first time period, wherein the first instantaneous transmission power limit is based at least in part on the first transmission power limit; and configuring a second instantaneous transmission power limit for the second communication link in the second time period, wherein the second instantaneous transmission power limit is based at least in part on the second transmission power limit.

In a forty-third aspect, alone or in combination with one or more of the first through forty-second aspects, the process 1200 further comprises determining a first requested transmission power for the first communication link in the first time period; configuring a first transmission power for the first communication link in the first time period, wherein the first transmission power is based at least in part on the lesser of the first instantaneous transmission power limit and the first requested transmission power; determining a second requested transmission power for the second communication link in the second time period; and configuring a second transmission power for the second communication link in the second time period, wherein the second transmission power is based at least in part on the lesser of the second instantaneous transmission power limit and the second requested transmission power.

In a forty-fourth aspect, alone or in combination with one or more of the first through forty-third aspects, the process 1200 further comprises transmitting using the first communication link in accordance with the first transmission power during the first time period; transmitting using the second communication link in accordance with the second transmission power during the second time period; and generating a report indicating the first transmission power and the second transmission power.

In a forty-fifth aspect, alone or in combination with one or more of the first through forty-fourth aspects, the process 1200 further comprises configuring, based at least in part on comparing the first transmission power to the first instantaneous transmission power limit and the second transmission power to the second instantaneous transmission power limit, at least one of a portion of the first energy allocation for use by the second communication link or a portion of the second energy allocation for use by for the first communication link.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
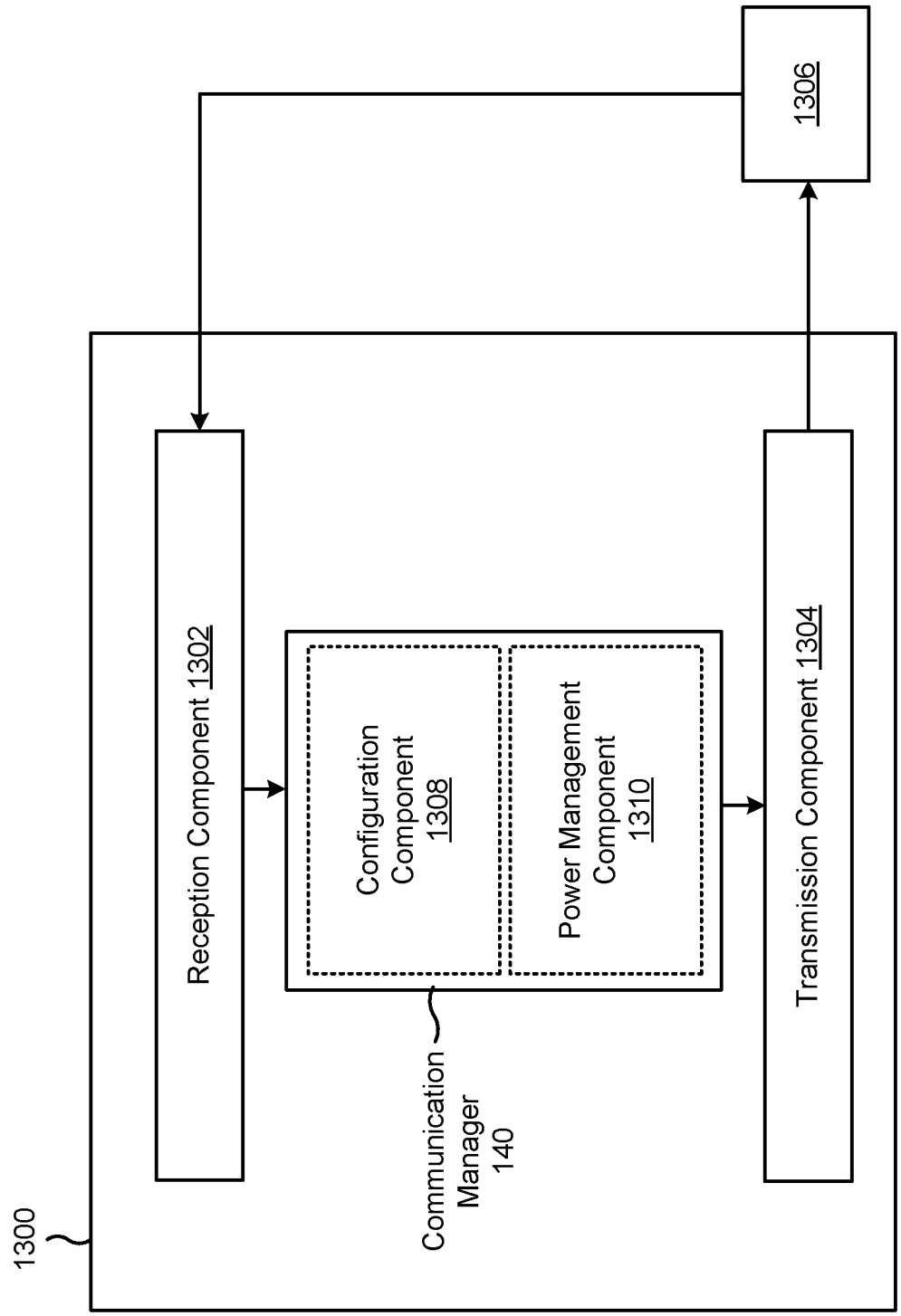
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a configuration component 1308 and/or a power management component 1310, among other examples. In some aspects, the configuration component 1308 and the power management component 1310 may be the same component, while in other aspects the configuration component 1308 and the power management component 1310 may be different components. Moreover, in some aspects the configuration component 1308 and/or the power management component 1310 may be the same component as the energy allocator 915 and/or may perform the functions described in connection with the energy allocator 915.

In some aspects, the apparatus 1300 may be configured to perform one or more operations described herein in connection with FIGS. 3-11. Additionally, or alternatively, the apparatus 1300 may be configured to perform one or more processes described herein, such as process 1200 of FIG. 12. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The configuration component 1308 may configure a first energy allocation for a first communication link of the UE in a first time period. The configuration component 1308 may configure a second energy allocation for a second communication link of the UE in a second time period, wherein the first energy allocation and the second energy allocation are based at least in part on a shared amount of energy for the first communication link and the second communication link. The configuration component 1308 may configure a third energy allocation for the first communication link in a third time period, wherein the third energy allocation is an adjustment of the first energy allocation. The configuration component 1308 may configure a fourth energy allocation for the second communication link in a fourth time period, wherein the fourth energy allocation is an adjustment of the second energy allocation, and wherein the third energy allocation and the fourth energy allocation are based at least in part on the shared amount of energy. The transmission component 1304 may transmit using at least one of the first communication link in accordance with the third energy allocation or the second communication link in accordance with the fourth energy allocation.

The configuration component 1308 may configure a fifth energy allocation for the first communication link in the first time period, wherein the fifth energy allocation is not based on the shared amount of energy for the first communication link and the second communication link.

The power management component 1310 may add at least a portion of unused energy from the fifth energy allocation to the shared amount of energy.

The power management component 1310 may determine a transmission power associated with the first communication link for the first time period based at least in part on the first energy allocation and the fifth energy allocation.

The power management component 1310 may add at least one of unused energy from the first energy allocation or unused energy from the second energy allocation to the shared amount of energy.

The transmission component 1304 may provide, to a base station, an indication of an amount of energy remaining in the shared amount of energy.

The transmission component 1304 may provide, to a base station, a BSR communication associated with the first communication link based at least in part on the shared amount of energy.

The power management component 1310 may add at least one of a portion of energy associated with the first energy allocation or a portion of energy associated with the second energy allocation to the shared amount of energy based at least in part on a comparison of a peak transmission power of the UE to an average transmission power of the UE.

The power management component 1310 may determine a transmission power for one of the first communication link or the second communication link based at least in part on the exposure ratio.

The power management component 1310 determine the transmission power for the one of the first communication link or the second communication link based at least in part on a conversion factor associated with two different time periods.

The power management component 1310 select the conversion factor from multiple conversion factors associated with the one of the first communication link or the second communication link.

The power management component 1310 may provide a transmission power report based at least in part on a transmission power for one of the first communication link and the second communication link.

The power management component 1310 may select the conversion factor from multiple conversion factors associated with the one of the first communication link or the second communication link.

The configuration component 1308 may configure a portion of the first energy allocation or the third energy allocation for use by the second communication link.

The configuration component 1308 may configure a first transmission power limit associated with the first communication link for a fifth time period, wherein the first transmission power limit is associated with a first band; and configure a second transmission power limit associated with the second communication link for the fifth time period, wherein the second transmission power limit is associated with a second band different than the first band.

The configuration component 1308 may configure a first instantaneous transmission power limit for the first communication link in the first time period, wherein the first instantaneous transmission power limit is based at least in part on the first transmission power limit; and configure a second instantaneous transmission power limit for the second communication link in the second time period, wherein the second instantaneous transmission power limit is based at least in part on the second transmission power limit.

The power management component 1310 may determine a first requested transmission power for the first communication link in the first time period; configure a first transmission power for the first communication link in the first time period, wherein the first transmission power is based at least in part on the lesser of the first instantaneous transmission power limit and the first requested transmission power; determine a second requested transmission power for the second communication link in the second time period;

and configure a second transmission power for the second communication link in the second time period, wherein the second transmission power is based at least in part on the lesser of the second instantaneous transmission power limit and the second requested transmission power.

The transmission component 1304 may transmit using the first communication link in accordance with the first transmission power during the first time period; transmit using the second communication link in accordance with the second transmission power during the second time period; and generate a report indicating the first transmission power and the second transmission power.

The configuration component 1308 may configure, based at least in part on comparing the first transmission power to the first instantaneous transmission power limit and the second transmission power to the second instantaneous transmission power limit, at least one of a portion of the first energy allocation for use by the second communication link or a portion of the second energy allocation for use by for the first communication link.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: identifying an available energy for uplink transmission of a plurality of communication links of the UE; configuring, from the available energy, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission; configuring a second set of energy allocations for one or more communication links of the plurality of communication links, wherein the second set of energy allocations are allocated from a remainder of the available energy after the set of first energy allocations are allocated; and transmitting based at least in part on at least one of the set of first energy allocations or the one or more second energy allocations.

Aspect 2: The method of Aspect 1, wherein the available energy is based at least in part on an exposure limit.

Aspect 3: The method of any of Aspects 1-2, wherein the available energy includes a first available energy associated with a first communication link of the plurality of communication links and a second available energy associated with a second communication link of the plurality of communication links.

Aspect 4: The method of Aspect 3, wherein the first available energy is different than the second available energy.

Aspect 5: The method of any of Aspects 1-4, wherein the control traffic parameter is based at least in part on at least one of: a physical uplink control channel (PUCCH) transmit power, a PUCCH transmit time, a PUCCH duty cycle, a random access channel (RACH) transmit power ramp counter, a RACH preamble target power, a sounding reference signal channel, or a RACH preamble duration.

Aspect 6: The method of any of Aspects 1-5, wherein the second set of energy allocations are associated with transmission of best-effort traffic.

Aspect 7: The method of any of Aspects 1-6, wherein the first set of energy allocations are associated with transmission of at least one of: a control channel, or a data transmission associated with a threshold priority.

Aspect 8: The method of any of Aspects 1-7, wherein the requested amount of energy is based at least in part on a request generated by a medium access control entity associated with the communication link.

Aspect 9: The method of any of Aspects 1-8, wherein the first set of energy allocations are based at least in part on a plurality of priorities corresponding to the plurality of communication links.

Aspect 10: The method of any of Aspects 1-9, further comprising: determining a buffer status based at least in part on the second set of energy allocations, wherein transmitting based at least in part on at least one of the first set of energy allocations or the second set of energy allocations is based at least in part on the buffer status.

Aspect 11: The method of any of Aspects 1-10, wherein a first energy allocation of the first set of energy allocations is based at least in part on a service associated with the UE.

Aspect 12: The method of any of Aspects 1-11, wherein, based at least in part on the UE being in a mode, the requested amount of energy is configured to provide a threshold transmit power for the uplink transmission throughout a time interval.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
   identify an available energy for uplink transmission of a plurality of communication links of the UE;
   allocate a total minimum reserve among the plurality of communication links;
   configure, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission, and wherein the control traffic parameter is based at least in part on at least one of:
   a physical uplink control channel (PUCCH) transmit power,
   a PUCCH transmit time,
   a PUCCH duty cycle,
   a random access channel (RACH) transmit power ramp counter,
   a RACH preamble power,
   a sounding reference signal power,
   a sounding reference signal duration,
   a sounding reference signal duty cycle, or
   a RACH preamble duration;
   configure a second set of energy allocations for one or more communication links of the plurality of communication links, wherein the second set of energy allocations are allocated from a remainder of the available energy after the first set of energy allocations are allocated; and
   transmit based at least in part on at least one of the first set of energy allocations or the second set of energy allocations.

2. The UE of claim 1, wherein the available energy is based at least in part on an exposure limit.

3. The UE of claim 1, wherein the available energy includes a first available energy associated with a first communication link of the plurality of communication links and a second available energy associated with a second communication link of the plurality of communication links.

4. The UE of claim 3, wherein the first available energy is different than the second available energy.

5. The UE of claim 1, wherein the second set of energy allocations are associated with transmission of best-effort traffic.

6. The UE of claim 1, wherein the first set of energy allocations are associated with transmission of at least one of:
   a control channel, or
   a data transmission associated with a threshold priority.

7. The UE of claim 1, wherein the first set of energy allocations are based at least in part on a plurality of priorities corresponding to the plurality of communication links.

8. The UE of claim 1, wherein the one or more processors are further configured to:
   determine a buffer status based at least in part on the second set of energy allocations, wherein the transmission based at least in part on at least one of the first set of energy allocations or the second set of energy allocations is based at least in part on the buffer status.

9. The UE of claim 1, wherein a first energy allocation of the first set of energy allocations is based at least in part on a service associated with the UE.

10. The UE of claim 1, wherein the requested amount of energy is configured to provide a threshold transmit power for the uplink transmission throughout a time interval.

11. The UE of claim 1, wherein the requested amount of energy is based at least in part on a filtered value based at least in part on a measured transmit power.

12. The UE of claim 1, wherein the allocated total minimum reserve is split among each communication link of the plurality of communication links based at least in part on a user configuration.

13. The UE of claim 1, wherein the allocation of the total minimum reserve is based at least in part on at least one of:
   a service type,
   an antenna group,
   a number of active radios,
   an anchor status,
   a window size,
   a radio frequency condition, or
   energy usage.

14. The UE of claim 1, wherein the one or more processors, to allocate the total minimum reserve, are configured to sum minimum dynamic energy reserves across all communication links of the plurality of communication links.

15. The UE of claim 1, wherein the plurality of communication links of the UE correspond to a plurality of radios of the UE.

16. The UE of claim 1, wherein the available energy is for uplink transmission in a transmission interval, the first set energy allocations are for the at least one communication link during the transmission interval, and the second set of energy allocations are for the one or more communication links during the transmission interval.

17. A method of wireless communication performed by a user equipment (UE), comprising:
   identifying an available energy for uplink transmission of a plurality of communication links of the UE;
   allocating a total minimum reserve among the plurality of communication links;
   configuring, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission, and wherein the control traffic parameter is based at least in part on at least one of:
      a physical uplink control channel (PUCCH) transmit power,
      a PUCCH transmit time,
      a PUCCH duty cycle,
      a random access channel (RACH) transmit power ramp counter,
      a RACH preamble power,
      a sounding reference signal power,
      a sounding reference signal duration,
      a sounding reference signal duty cycle, or
      a RACH preamble duration;
   configuring a second set of energy allocations for one or more communication links of the plurality of communication links, wherein the second set of energy allocations are allocated from a remainder of the available energy after the first set of energy allocations are allocated; and
   transmitting based at least in part on at least one of the first set of energy allocations or the second set of energy allocations.

18. The method of claim 17, wherein the available energy is based at least in part on an exposure limit.

19. The method of claim 17, wherein the available energy includes a first available energy associated with a first communication link of the plurality of communication links and a second available energy associated with a second communication link of the plurality of communication links.

20. The method of claim 19, wherein the first available energy is different than the second available energy.

21. The method of claim 17, wherein the second set of energy allocations are associated with transmission of best-effort traffic.

22. The method of claim 17, wherein the first set of energy allocations are associated with transmission of at least one of:
   a control channel, or
   a data transmission associated with a threshold priority.

23. The method of claim 17, wherein the first set of energy allocations are based at least in part on a plurality of priorities corresponding to the plurality of communication links.

24. The method of claim 17, further comprising:
   determining a buffer status based at least in part on the second set of energy allocations, wherein transmitting based at least in part on at least one of the first set of energy allocations or the second set of energy allocations is based at least in part on the buffer status.

25. The method of claim 17, wherein a first energy allocation of the first set of energy allocations is based at least in part on a service associated with the UE.

26. The method of claim 17, wherein the requested amount of energy is configured to provide a threshold transmit power for the uplink transmission throughout a time interval.

27. A non-transitory computer-readable medium storing a set of instructions for wireless communication, the set of instructions comprising:
   one or more instructions that, when executed by one or more processors of a user equipment (UE), cause the UE to:
      identify an available energy for uplink transmission of a plurality of communication links of the UE;
      allocate a total minimum reserve among the plurality of communication links;
      configure, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission, and wherein the control traffic parameter is based at least in part on at least one of:
         a physical uplink control channel (PUCCH) transmit power,
         a PUCCH transmit time,
         a PUCCH duty cycle,
         a random access channel (RACH) transmit power ramp counter,
         a RACH preamble power,
         a sounding reference signal power,
         a sounding reference signal duration,
         a sounding reference signal duty cycle, or
         a RACH preamble duration;

configure a second set of energy allocations for one or more communication links of the plurality of communication links, wherein the second set of energy allocations are allocated from a remainder of the available energy after the first set of energy allocations are allocated; and transmit based at least in part on at least one of the first set of energy allocations or the second set of energy allocations.

28. The non-transitory computer-readable medium of claim 27, wherein the available energy is based at least in part on an exposure limit.

29. An apparatus for wireless communication, comprising:

means for identifying an available energy for uplink transmission of a plurality of communication links of the apparatus;

means for allocating a total minimum reserve among the plurality of communication links;

means for configuring, from the available energy and based at least in part on the allocated total minimum reserve, a first set of energy allocations for at least one communication link of the plurality of communication links, wherein the first set of energy allocations are based at least in part on at least one of a control traffic parameter for the at least one communication link or a requested amount of energy for the at least one communication link, wherein the requested amount of energy is based at least in part on a priority of data for transmission, and wherein the control traffic parameter is based at least in part on at least one of:
- a physical uplink control channel (PUCCH) transmit power,
- a PUCCH transmit time,
- a PUCCH duty cycle,
- a random access channel (RACH) transmit power ramp counter,
- a RACH preamble power,
- a sounding reference signal power,
- a sounding reference signal duration,
- a sounding reference signal duty cycle, or
- a RACH preamble duration;

means for configuring a second set of energy allocations for one or more communication links of the plurality of communication links, wherein the second set of energy allocations are allocated from a remainder of the available energy after the first set of energy allocations are allocated; and means for transmitting based at least in part on at least one of the first set of energy allocations or the second set of energy allocations.

30. The apparatus of claim 29, wherein the available energy is based at least in part on an exposure limit.

* * * * *